United States Patent
Fukunaga

[11] Patent Number: 5,299,303
[45] Date of Patent: Mar. 29, 1994

[54] DOCUMENT PROCESSING APPARATUS AND METHOD FOR ARRANGING EACH LINE OF ITEM INFORMATION IN RESPONSE TO INSTRUCTING THE ARRANGING OF THE ITEM INFORMATION STORED IN A MEMORY

[75] Inventor: Koji Fukunaga, Tokyo, Japan

[73] Assignee: Canon Kabushiki Kaisha, Tokyo, Japan

[21] Appl. No.: 109,459

[22] Filed: Aug. 20, 1993

Related U.S. Application Data

[63] Continuation of Ser. No. 507,573, Apr. 11, 1990, abandoned.

[30] Foreign Application Priority Data

Apr. 12, 1989 [JP] Japan .................................. 1-90848

[51] Int. Cl.$^5$ ............................................ G06F 15/62
[52] U.S. Cl. ...................................... 395/146; 395/148
[58] Field of Search .............................. 395/144–149; 364/419

[56] References Cited

U.S. PATENT DOCUMENTS

| | | | |
|---|---|---|---|
| 4,481,603 | 11/1984 | McCaskill et al. | 395/148 X |
| 4,783,760 | 11/1988 | Carosso | 364/419 |
| 4,951,233 | 8/1990 | Fujiwara et al. | 364/523 |
| 4,977,536 | 12/1990 | Shimamura | 395/145 |
| 4,980,841 | 12/1990 | Sugitani | 395/148 |
| 5,052,835 | 10/1991 | Takahashi | 395/148 |
| 5,055,998 | 10/1991 | Wright et al. | 364/200 |

FOREIGN PATENT DOCUMENTS 0066045 12/1982 European Pat. Off. .
0075734 4/1983 European Pat. Off. .
0298166 1/1989 European Pat. Off. .

OTHER PUBLICATIONS

Patent Abstracts of Japan, vol. 13, No. 138, an English Abstract published Apr. 6, 1989 of Japanese Pat. No. 63 305 454.
"Logic for Centering Column Headings With A Word Processor", IBM Technical Disclosure Bulletin, W. R. McCray, vol. 25, No. 2, Jul. 2, 1982, p. 677.

Primary Examiner—Heather R. Herndon
Attorney, Agent, or Firm—Fitzpatrick, Cella, Harper & Scinto

[57] ABSTRACT

A document processing apparatus and method includes a designating device, a memory, an instruction device, an arranger, a margin setter, and an expander. The designating device designates the partition of item information. The memory stores data of a plurality of lines comprising a plurality of pieces of the item information partitioned by the designating device. The instruction device instructs the arranging of the item information, and the arranger arranges each one line of the item information in response to an instruction by the instruction device. The margin setter sets a margin position of document information, while the expander expands the margin position when table document information to form a table document is input beyond the margin position so as to store the table document information.

24 Claims, 25 Drawing Sheets

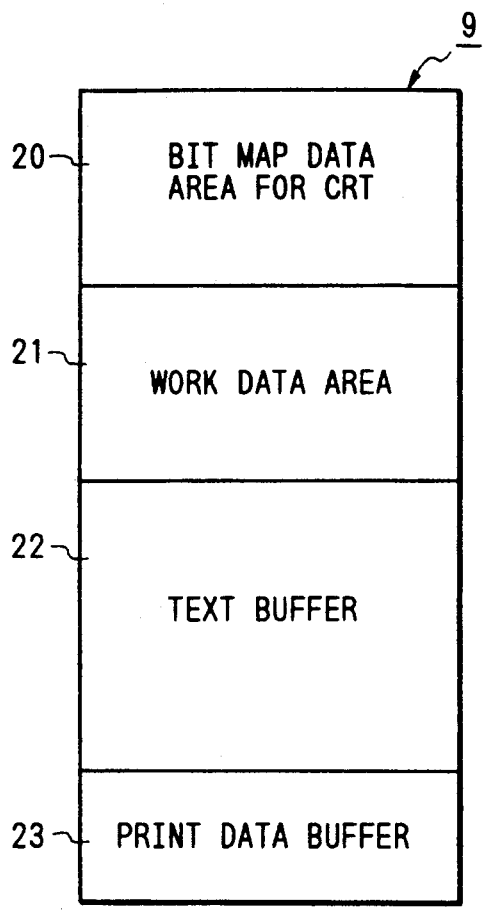
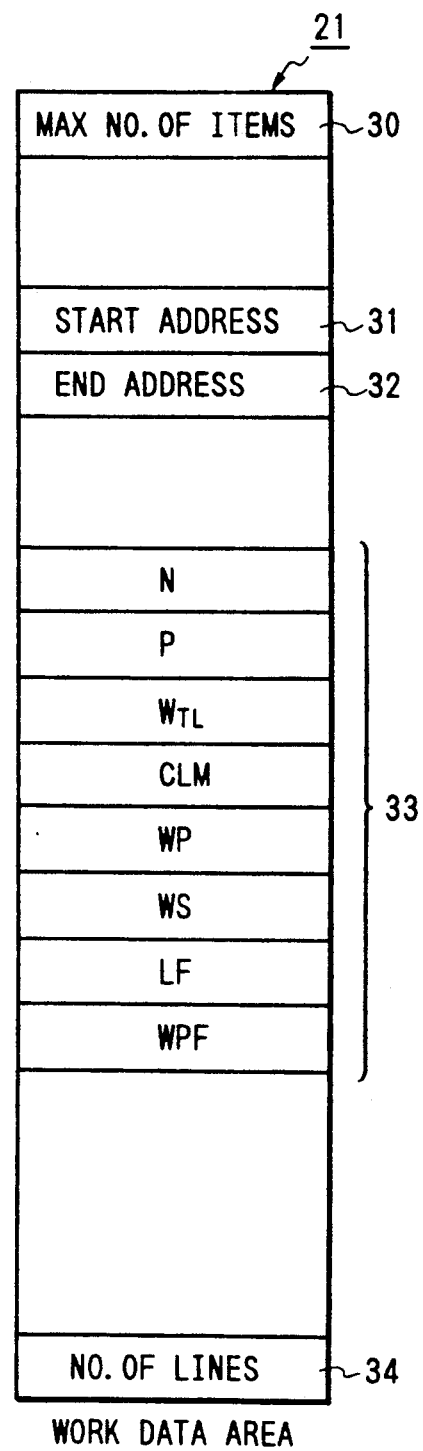

FIG. 6C

| TAB | TABI |
|---|---|
| STANDARD | 1 |
| DECIMAL | 2 |
| CENTERING | 3 |
| RIGHT ALIGNMENT | 4 |

FIG. 16A
| n   | 1 | 2 | 3 | 4 | 5 | 6 | 7 | .... | N |
|-----|---|---|---|---|---|---|---|------|---|
| $WP_n$ | 0 | 0 | 0 | 0 | 0 | 0 | 0 |      | 0 |
| $WS_n$ | 0 | 0 | 0 | 0 | 0 | 0 | 0 |      | 0 |
| $WT_n$ | 0 | 0 | 0 | 0 | 0 | 0 | 0 |      | 0 |
| $W_n$  | 0 | 0 | 0 | 0 | 0 | 0 | 0 |      | 0 |
FIG. 16B
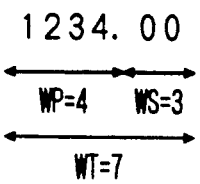
FIG. 16C
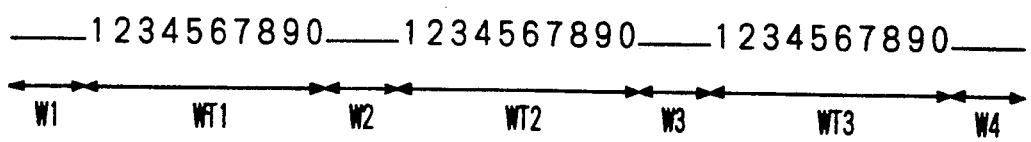

FIG. 17A

| n    | 1  | 2  | 3  | 4 | 5 | 6 | 7 | .... | N |
|------|----|----|----|---|---|---|---|------|---|
| WPn  | 10 | 10 | 10 | 0 | 0 | 0 | 0 |      | 0 |
| WSn  | 0  | 0  | 0  | 0 | 0 | 0 | 0 |      | 0 |
| WTn  | 10 | 10 | 10 | 0 | 0 | 0 | 0 |      | 0 |
| Wn   | 5  | 4  | 4  | 5 | 0 | 0 | 0 |      | 0 |

FIG. 17B

| n    | 1  | 2  | 3  | 4 | 5 | 6 | 7 | .... | N |
|------|----|----|----|---|---|---|---|------|---|
| WPn  | 10 | 10 | 10 | 0 | 0 | 0 | 0 |      | 0 |
| WSn  | 0  | 0  | 0  | 0 | 0 | 0 | 0 |      | 0 |
| WTn  | 10 | 10 | 10 | 0 | 0 | 0 | 0 |      | 0 |
| Wn   | 5  | 4  | 4  | 4 | 0 | 0 | 0 |      | 0 |

FIG. 17C

| n    | 1  | 2  | 3  | 4 | 5 | 6 | 7 | .... | N |
|------|----|----|----|---|---|---|---|------|---|
| WPn  | 10 | 10 | 10 | 0 | 0 | 0 | 0 |      | 0 |
| WSn  | 0  | 0  | 0  | 0 | 0 | 0 | 0 |      | 0 |
| WTn  | 10 | 10 | 10 | 0 | 0 | 0 | 0 |      | 0 |
| Wn   | 5  | 4  | 4  | 3 | 0 | 0 | 0 |      | 0 |

FIG. 17D

| n    | 1 | 2 | 3 | 4 | 5 | 6 | 7 | .... | N |
|------|---|---|---|---|---|---|---|------|---|
| WPn  | 8 | 3 | 5 | 0 | 0 | 0 | 0 |      | 0 |
| WSn  | 0 | 3 | 3 | 0 | 0 | 0 | 0 |      | 0 |
| WTn  | 8 | 6 | 8 | 0 | 0 | 0 | 0 |      | 0 |
| Wn   | 7 | 6 | 6 | 6 | 0 | 0 | 0 |      | 0 |

FIG. 18A

| 1 | 1 | 1 | 1 | |
|---|---|---|---|---|
| 48 | 6 | 20 | 34 | ......... |

| 1 | 1 | 2 | 2 | |
|---|---|---|---|---|
| 48 | 8 | 25 | 40 | ......... |

FIG. 18C

| 1 | 3 | 3 | 3 | |
|---|---|---|---|---|
| 48 | 10 | 24 | 38 | ......... |

FIG. 18D

| 1 | 4 | 4 | 4 | |
|---|---|---|---|---|
| 48 | 15 | 29 | 43 | ......... |

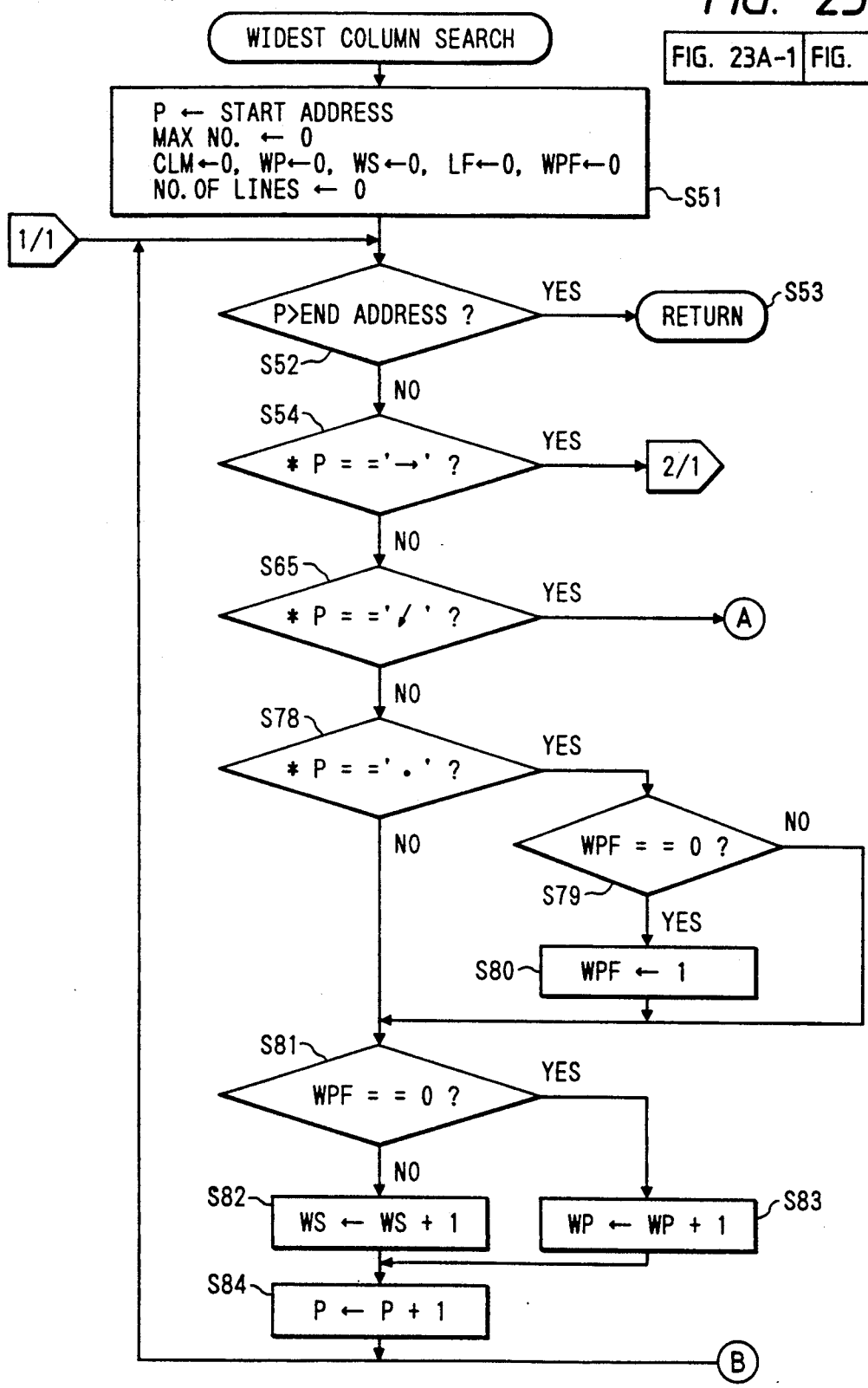

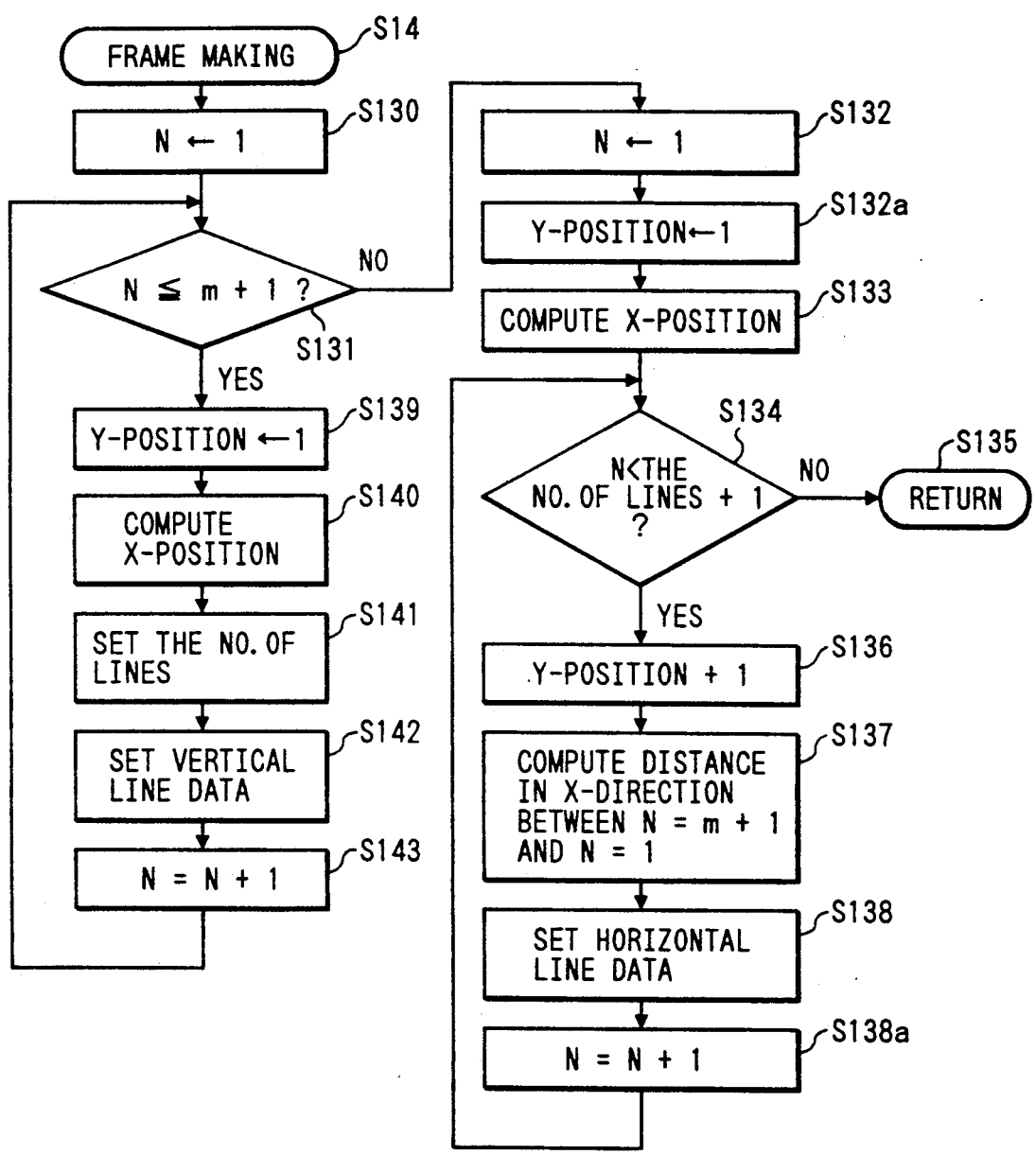

DOCUMENT PROCESSING APPARATUS AND METHOD FOR ARRANGING EACH LINE OF ITEM INFORMATION IN RESPONSE TO INSTRUCTING THE ARRANGING OF THE ITEM INFORMATION STORED IN A MEMORY

This application is a continuation of application Ser. No. 07/507,573, filed Apr. 11, 1990, now abandoned.

BACKGROUND OF THE INVENTION

1. Field of the Invention

The present invention relates to a document processing apparatus having a table making function.

2. Related Background Art

In a conventional apparatus, when document information is input by executing a table making processing, an operator estimates or assumes a format suitable for input data beforehand, and then inputs document information. Upon estimation of the format, document data of a reference line, e.g., a longest line is input, and the format is determined according to the content of the line.

Therefore, in order to determine the format in this manner, the operator must check the entire table document, search a reference document line from the document information, and estimate the format from the searched line, resulting in a heavy load on the operator. When the document information of the reference line is changed, the entire format must be changed, and the format must be determined again for making a table.

During input of table data, when the table data has a size exceeding a predetermined margin position, the operator must input the table data after he or she changes the margin position, and, hence, must interrupt a series of table data input processing operations. Furthermore, when document information is input according to table data after the table data is input, if tab positions are set according to input positions in the table, the document information can be efficiently input. However, the operator must set these tab positions.

SUMMARY OF THE INVENTION

The present invention has been made in consideration of the above situation, and has as its object to provide a document processing apparatus which can automatically form table data corresponding to document information.

It is another object of the present invention to provide a document processing apparatus which can automatically discriminate a tab sort operation on the basis of document information of each item.

It is still another object of the present invention to provide a document processing apparatus which can automatically move a margin position in a release direction in correspondence with the input of table information.

It is still another object of the present invention to provide a document processing apparatus comprising designation means for designating divisions of items in document information, detection means for detecting a maximum width in each item designated by the designation means, assignment means for substantially equally assigning a space portion obtained by subtracting a total of the maximum widths from a maximum document region in a line direction to each item, and table making means for referring to the divided space portions and the maximum widths of the items, and generating ruled line information consisting of vertical lines passing through substantially the centers of the space portions, and horizontal lines defining lines.

According to the present invention, a maximum width in each item designated by the designation means for designating divisions of items in document information is detected, a space portion obtained by subtracting a total of the maximum widths corresponding to items from a maximum document region in a line direction is substantially equally divided, the divided space portions are assigned to the items, and ruled line information consisting of vertical lines passing substantially the centers of the space portions assigned to the items and horizontal lines defining lines is formed with reference to the divided space portions and the maximum widths of the items.

BRIEF DESCRIPTION OF THE DRAWINGS

FIG. 3 shows a data format of a RAM;

FIG. 4 shows a data format of a work data area of the RAM;

FIG. 6C is a table showing codes indicating sorts of tabs;

FIGS. 15A to 15C show the case wherein a right margin position is moved to the right according to input information;

FIGS. 16A to 16C are views for explaining character position information;

FIGS. 17A to 17D respectively show position information of document information corresponding to FIGS. 8A to 10C and FIGS. 12A to 12C;

FIGS. 18A to 18D respectively show format information corresponding to FIGS. 8B, 12B, 10B, or 9B;

FIGS. 20 to 26 are flow charts showing a table input process in step S4 in FIG. 19.

DETAILED DESCRIPTION OF THE PREFERRED EMBODIMENT

A preferred embodiment of the present invention will now be described in detail with reference to the accompanying drawings.

Figure 1:
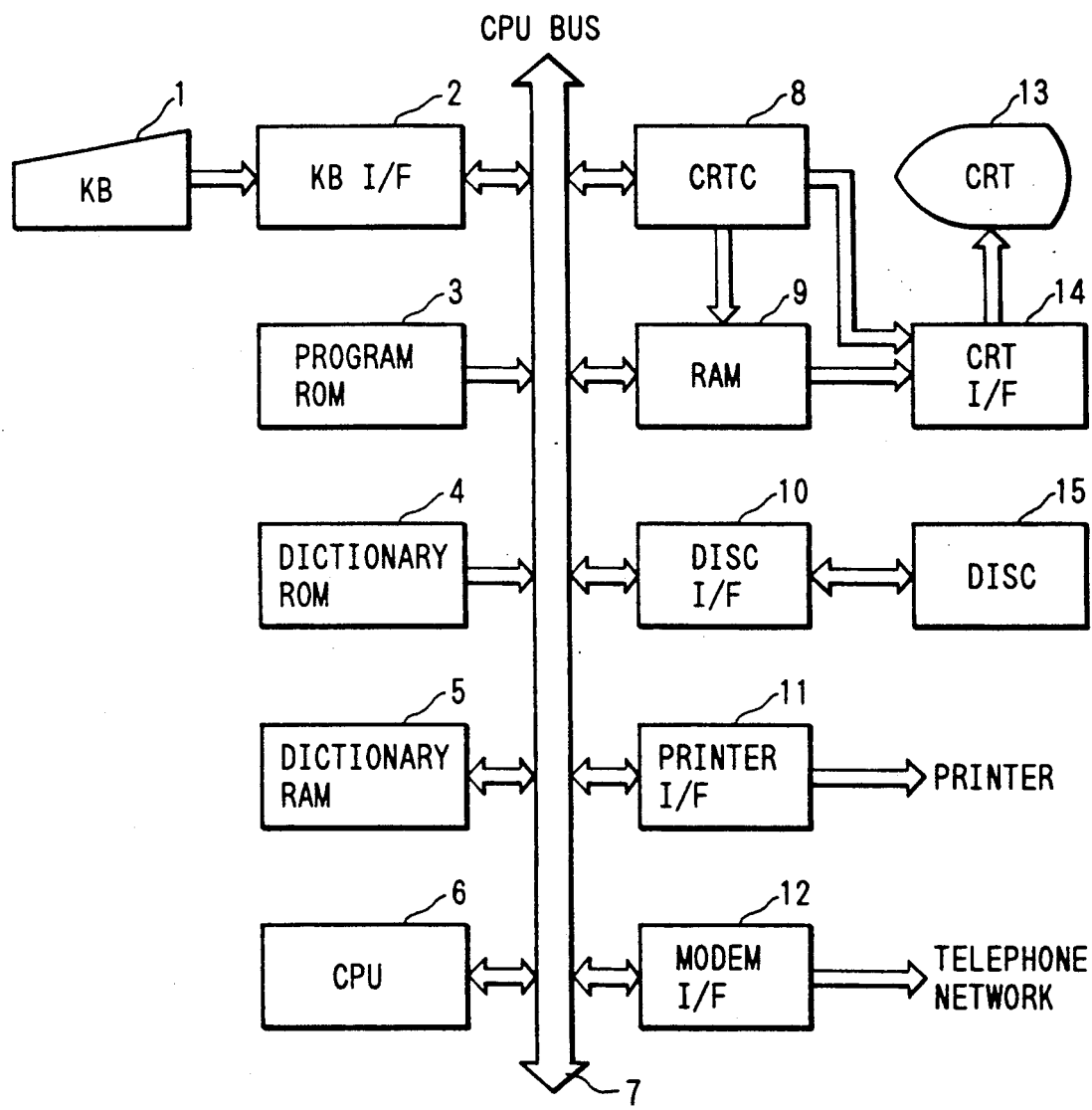
FIG. 1 is a schematic block diagram showing an arrangement of an English word processor according to an embodiment of the present invention.
Figure 2:
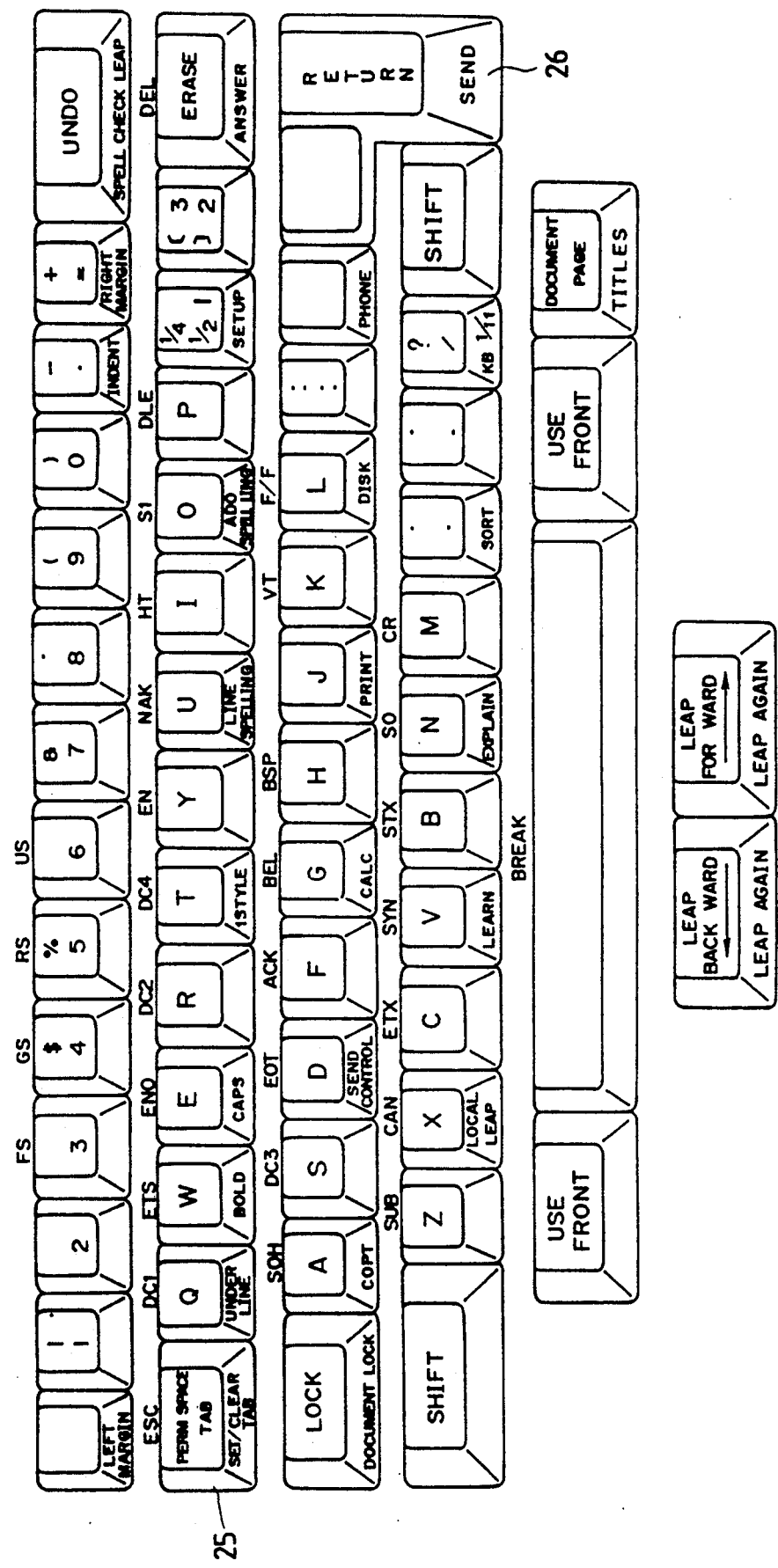
FIG. 2 is a view showing a keyboard matrix of the word processor of the embodiment shown in FIG. 1.

Description of Word Processor (FIGS. 1 to 3)

FIG. 1 is a schematic block diagram showing an arrangement of a control unit of an English word processor according to an embodiment of the present invention.

In FIG. 1, a keyboard (KB) 1 is connected to a keyboard interface (KB I/F) 2. As shown in FIG. 2, alphanumeric keys, symbol keys, and various function keys are arrayed on the KB 1. The KB I/F 2 receives a key code from the KB 1, and outputs it onto a CPU bus 7. The CPU bus 7 is connected to a program ROM 3, a dictionary ROM 4, a dictionary RAM 5, and a CPU 6. The program ROM 3 stores control programs for the CPU 6, various data, and the like. The dictionary ROM 4 stores a spelling check word dictionary. The dictionary RAM 5 is used by a user to register, as a dictionary, character strings, e.g., person's names which may be found to require correction during spelling checking. The CPU 6 executes various control process operations according to the control programs stored in the program ROM 3. The CPU bus 7 includes an address bus, a data bus, and a control bus.

The CPU bus 7 is also connected to a CRT controller (CRTC) 8 and a RAM 9. The CRTC 8 is connected to a display (CRT) 13. The CRTC 8 causes the CRT 13 to display bit map data stored in the RAM 9 in accordance with an instruction from the CPU 6. The RAM 9 stores document information input from the KB 1, and also stores display information to be displayed on the CRT 13 in the bit map format. The CRT 13 displays display information from the RAM 9 under the control of the CRTC 8. The CRTC 8 is also connected to a CRT interface (CRT I/F) 14. The CRT I/F 14 receives signals from the CRTC 8 and the RAM 9, and displays them on the CRT 13. An external storage 15 such as a hard disc or floppy disc unit stores input document information through a disc interface (DISC I/F) 10, and reads out corresponding document information according to an instruction from the CPU 6. The CPU bus 7 is also connected to a printer interface (I/F) 11 and a modem interface (I/F) 12. The printer I/F 11 executes data I/O control between a printer (not shown) and the CPU bus. The modem I/F 12 can transmit or receive information through a telephone network.

FIG. 3 shows a data format of the RAM 9 of the word processor of the embodiment shown in FIG. 1.

As shown in FIG. 3, the RAM 9 includes a CRT bit map area 20 for storing image data to be displayed on the CRT 13 in the bit map format, a work data area 21, used during a control operation of the CPU 6, for temporarily storing various data, a text buffer 22 for storing document information, table information, and the like in the code or data format, and a print data buffer 23 for storing data to be output to and printed by the printer.

FIG. 4 partially shows a data format of the work data area 21 of the RAM 9.

As shown in FIG. 4, the work data area 21 includes an area 30 for storing the maximum number of digits, i.e., the maximum number of digits of items in table data, areas 31 and 32 for respectively storing start and end addresses of table data (document information included in a frame) in the text buffer 22, N to WPF areas 33 which are used as work registers (to be described later), and an area 34 for storing the number of lines of input (formed) table data.

Figure 5:
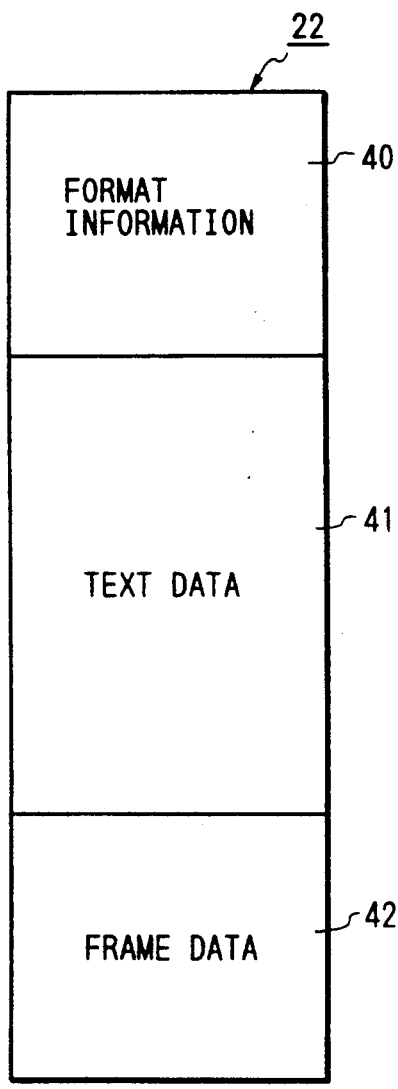
FIG. 5 shows a data format of a text buffer.
Figure 7:
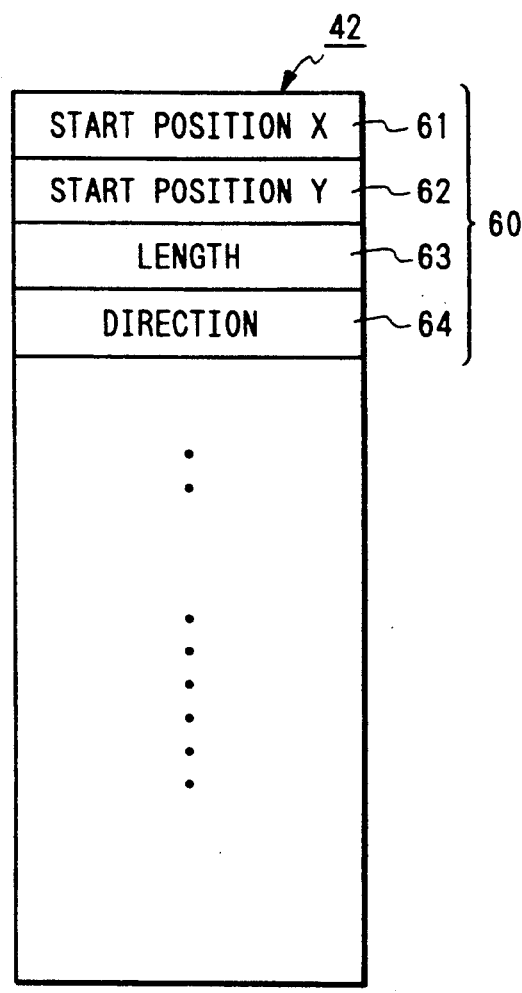
FIG. 7 shows a data format of frame information.

Description of Text Data (FIGS. 5 to 7)

FIG. 5 shows a data format of the text buffer 22.

A format information area 40 stores information associated with a format of text data. A text data area 41 stores document information, table data, and the like consisting of code information. A frame data area 42 stores frame data generated by a frame process of this embodiment.

FIGS. 7 shows a data format of the frame data area 42 of this embodiment.

Figure 6A:
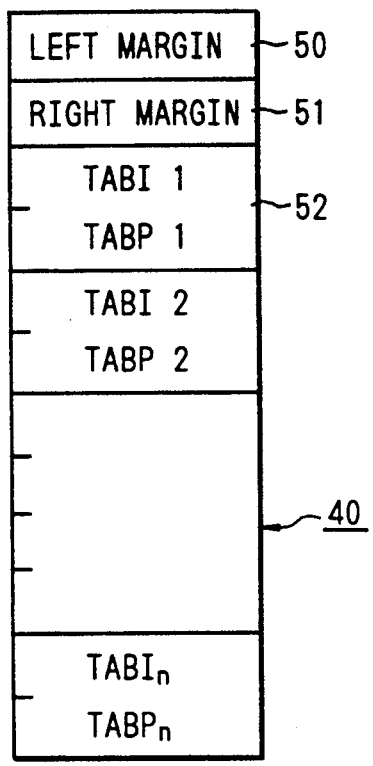
FIGS. 6A and 6B show data formats of a format information area.
Figure 6B:
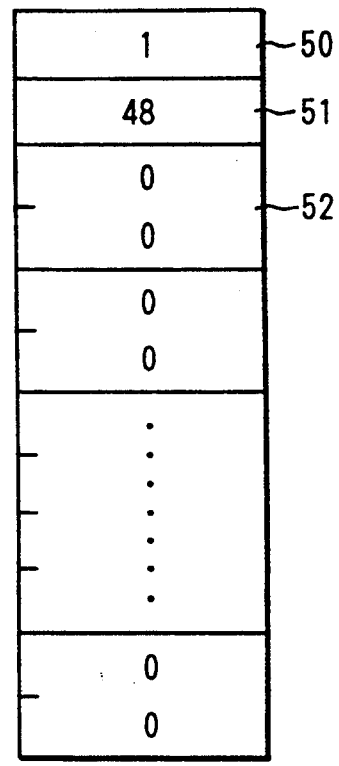

FIG. 6A shows a data format of the format information area. An area 50 stores left margin position information, and an area 51 stores right margin information. A tab information area 52 stores tab sort information TABI indicating information on tab sorting, and tab position (number of digits) information TABP. The area 52 can store a total of n pieces of tab position information. FIG. 6B shows an example of the format information. In FIG. 6B, the left margin position is set to be "1", and the right margin position is set to be "48". Since the tab information area stores all "0"s, no tab positions are set.

FIG. 6C is a table for explaining tab sort information (TABI). "1" designates a standard tab; "2" designates a decimal tab; "3" designates a centering tab; and "4" designates a right alignment (justification) tab.

FIG. 7 shows a data format of the frame data area 42 of the text buffer 22. The frame data area 42 stores frame data 60 of one line. The frame data 60 consists of x-coordinate data 61 of a frame start position, y-coordinate data 62 of the frame start position, frame length information 63, and frame direction data 64. When the frame direction data is "1", it indicates a lateral direction (horizontal direction); when it is "2", it indicates a longitudinal direction (vertical direction).

Examples of Document Information (FIGS. 8 to 14)

FIGS. 8A to 11 show examples of input document information.

Figure 8A:
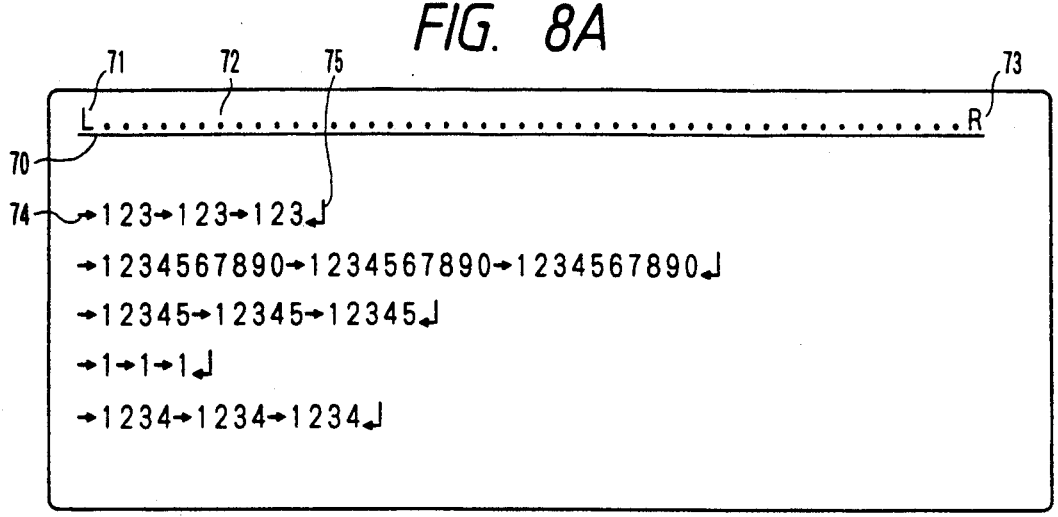
FIGS. 8A to 10C and FIGS. 12A to 12C show input data and formed tables.
Figure 9A:
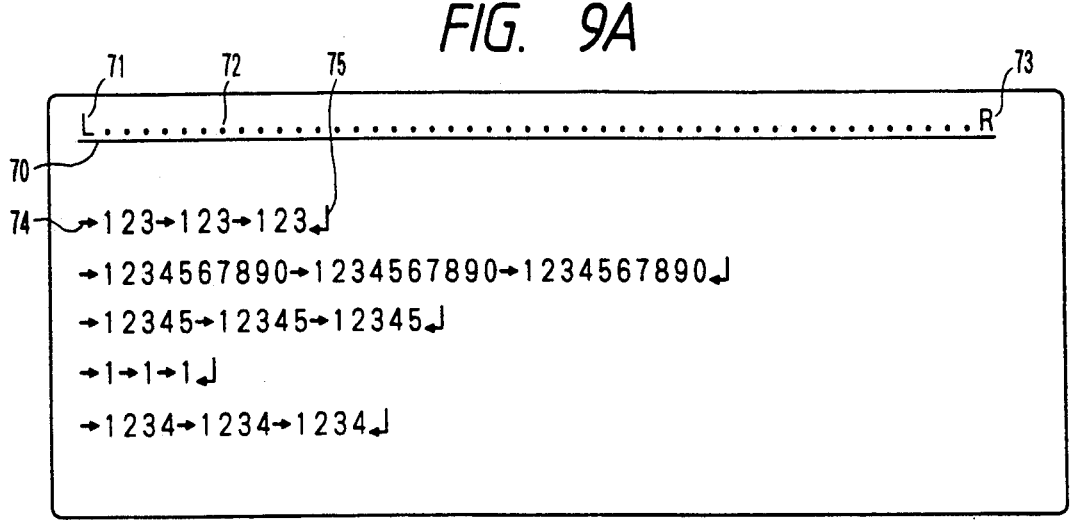
Figure 10A:
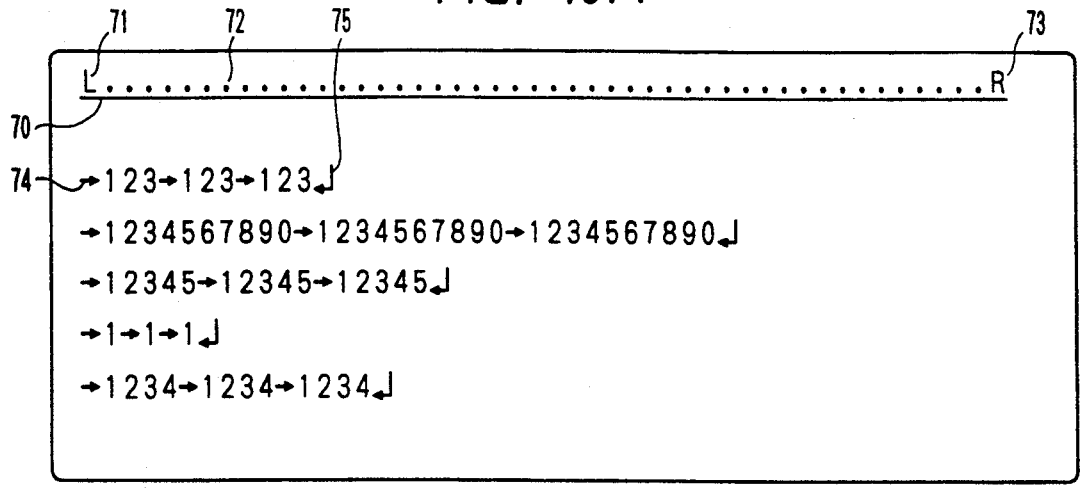

FIGS. 8A, 9A, and 10A show input examples of document information.

In FIGS. 8A, 9A, and 10A, reference numeral 70 designates a format line; L designates a left margin position; and R designates a right margin position. A point designated by reference numeral 72 indicates a column position (digit position) at which a character is displayed, and the margin positions and tab positions are determined on the basis of the column positions. Reference numeral 74 designates a tab code input by a tab key (25 in FIG. 2); and 75 designates a return code input by a return key (26 in FIG. 2).

Figure 8B:
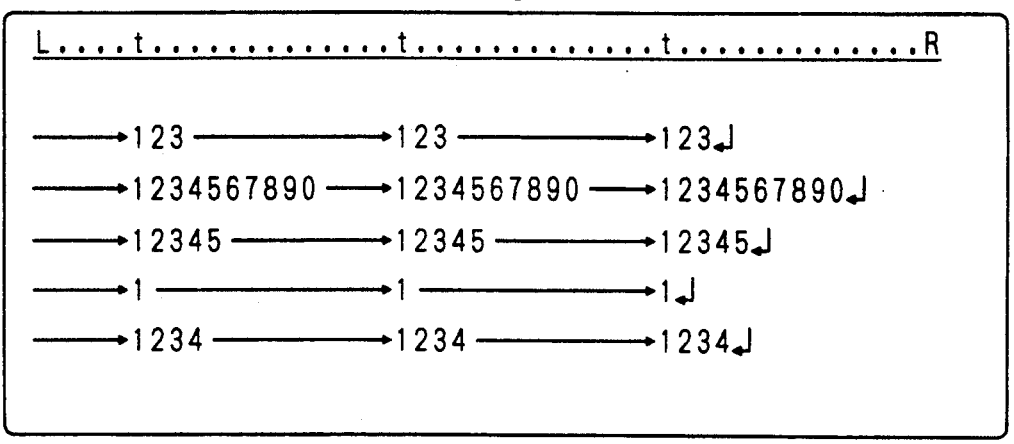
Figure 9B:
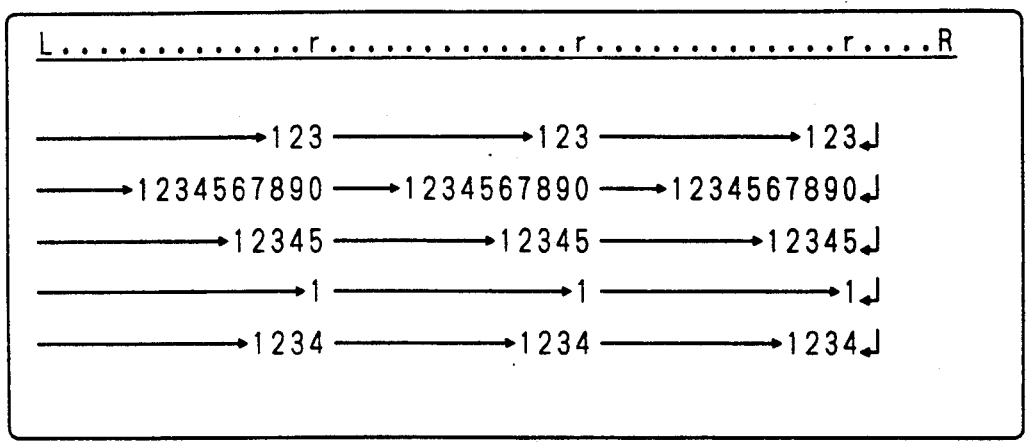
Figure 10B:
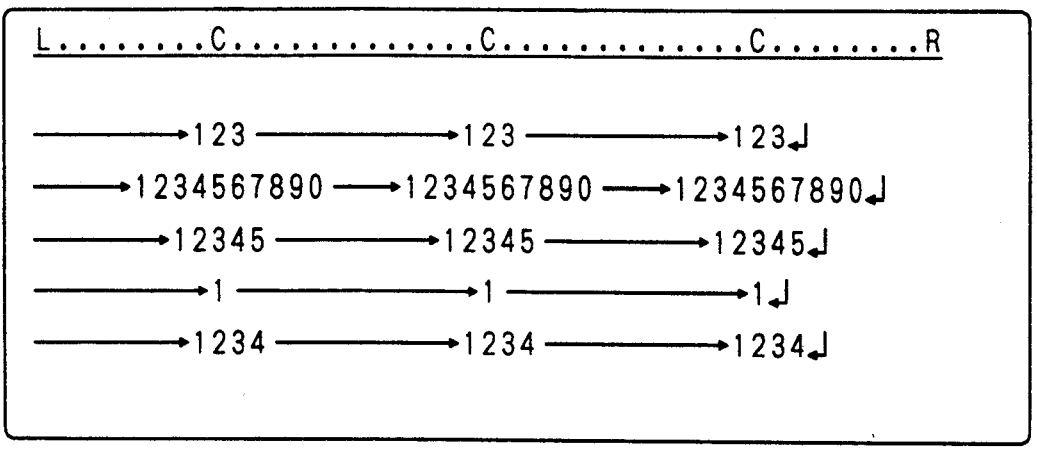
Figure 10C:
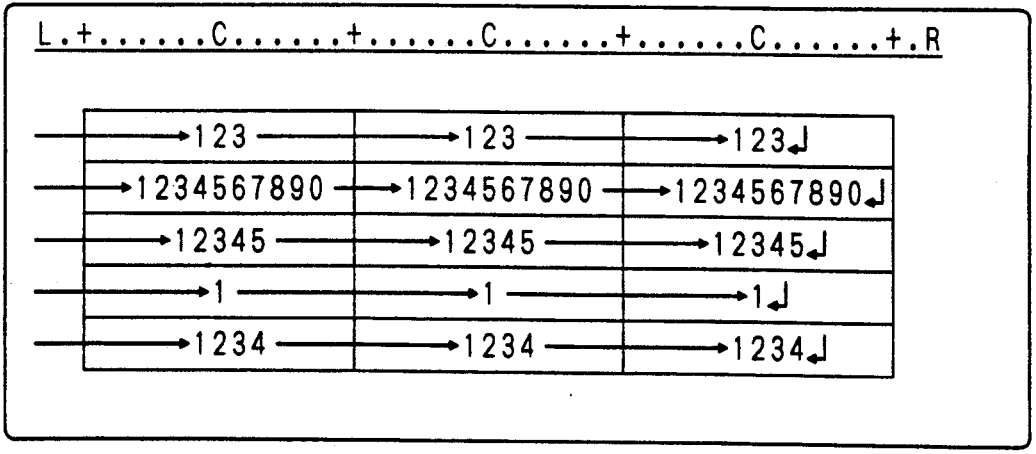

FIG. 8B shows a display example of document data input, as shown in FIG. 8A, when tabs are set at columns positions indicated by "t". Similarly, FIG. 9B shows a state when right alignment tabs are set at column positions indicated by "r". FIG. 10B shows a state wherein centering tabs are set at column positions indicated by "c".

FIGS. 8C to 10C show table data automatically generated in correspondence with FIGS. 8B to 10B according to this embodiment. In FIGS. 8C to 10C, "+" indicates a column position where table data is present.

Figure 11:
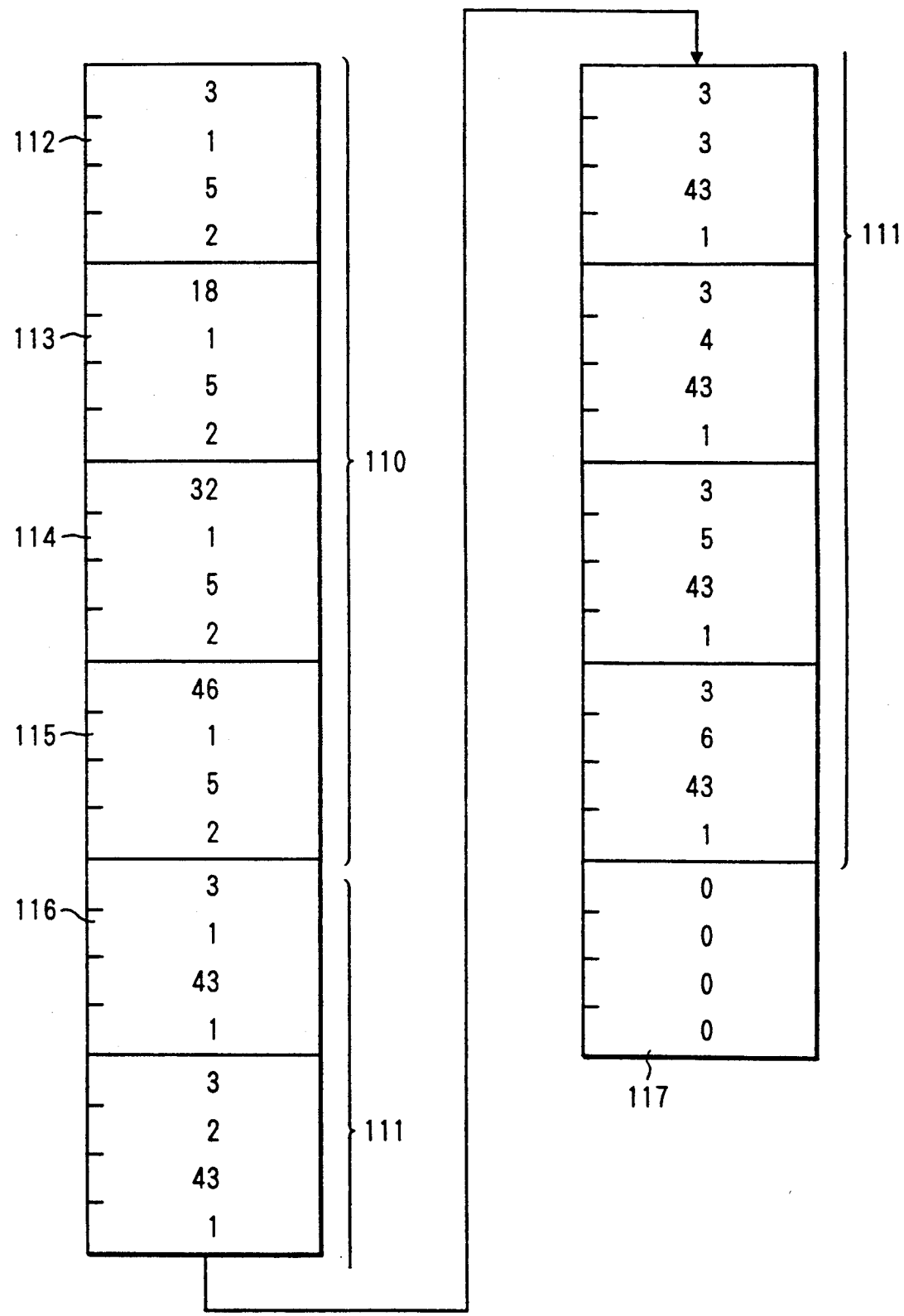
FIG. 11 shows frame information of FIGS. 8C, 9C, and 10C.

FIG. 11 shows detailed data of the frame data area 42. In this case, FIG. 11 shows frame data of FIGS. 8C to 10C.

In FIG. 11, frame data 112 represents a vertical line 77 of a frame. According to the data 112, the vertical line 77 has a start position (3, 1), and a vertical length of "5". In this coordinate position, an x-position is indicated by a column position, and a y-position is indicated by a line position. Frame data 113 represents a vertical line 78, frame data 114 represents a vertical line 79, and frame data 115 represents a vertical line 80. In this manner, data 110 represents vertical lines of the frame data. Data 111 represents horizontal lines of frame data. The data 111 consists of a total of six horizontal lines (length=43). For example, data 116 represents a horizontal line 81. As designated by reference numeral 117, all "0"s are set in the last four data.

Figure 12A:
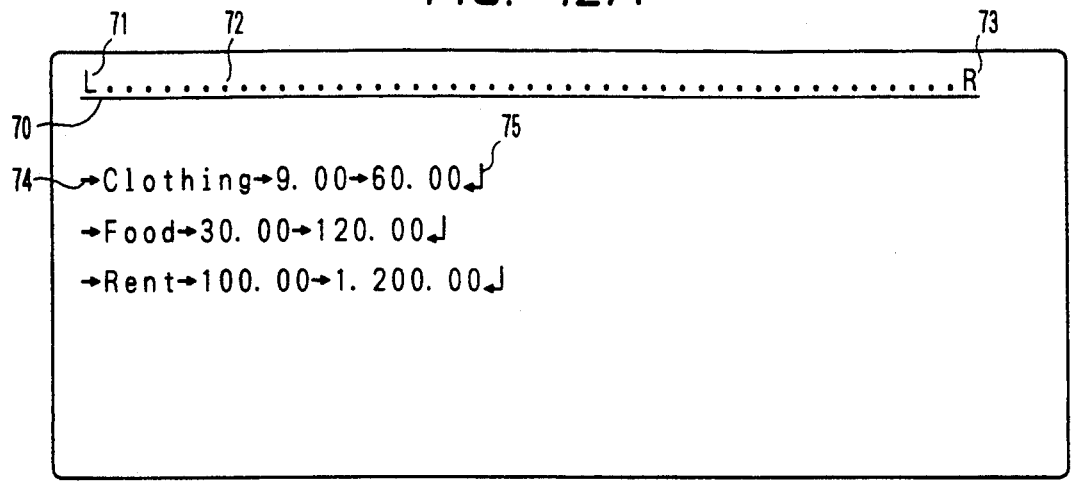
Figure 12B:
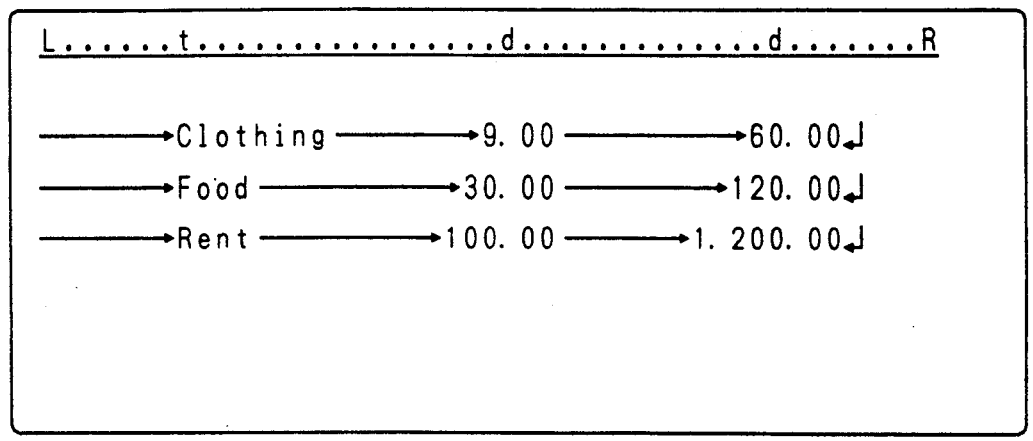
Figure 12C:
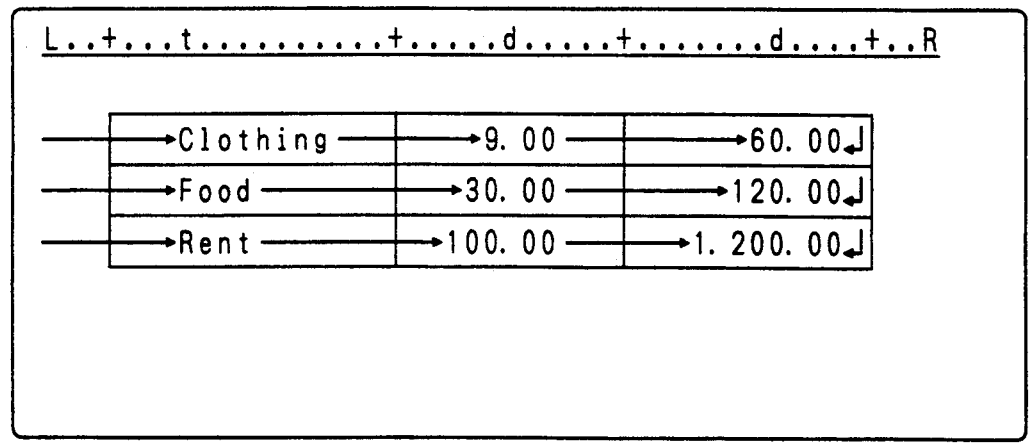

FIGS. 12A to 12C show an input example of document information using decimal tabs.

FIG. 12A shows input document information, and the same reference numerals in FIG. 12A denote the same parts as in FIGS. 8A to 10A.

Figure 13:
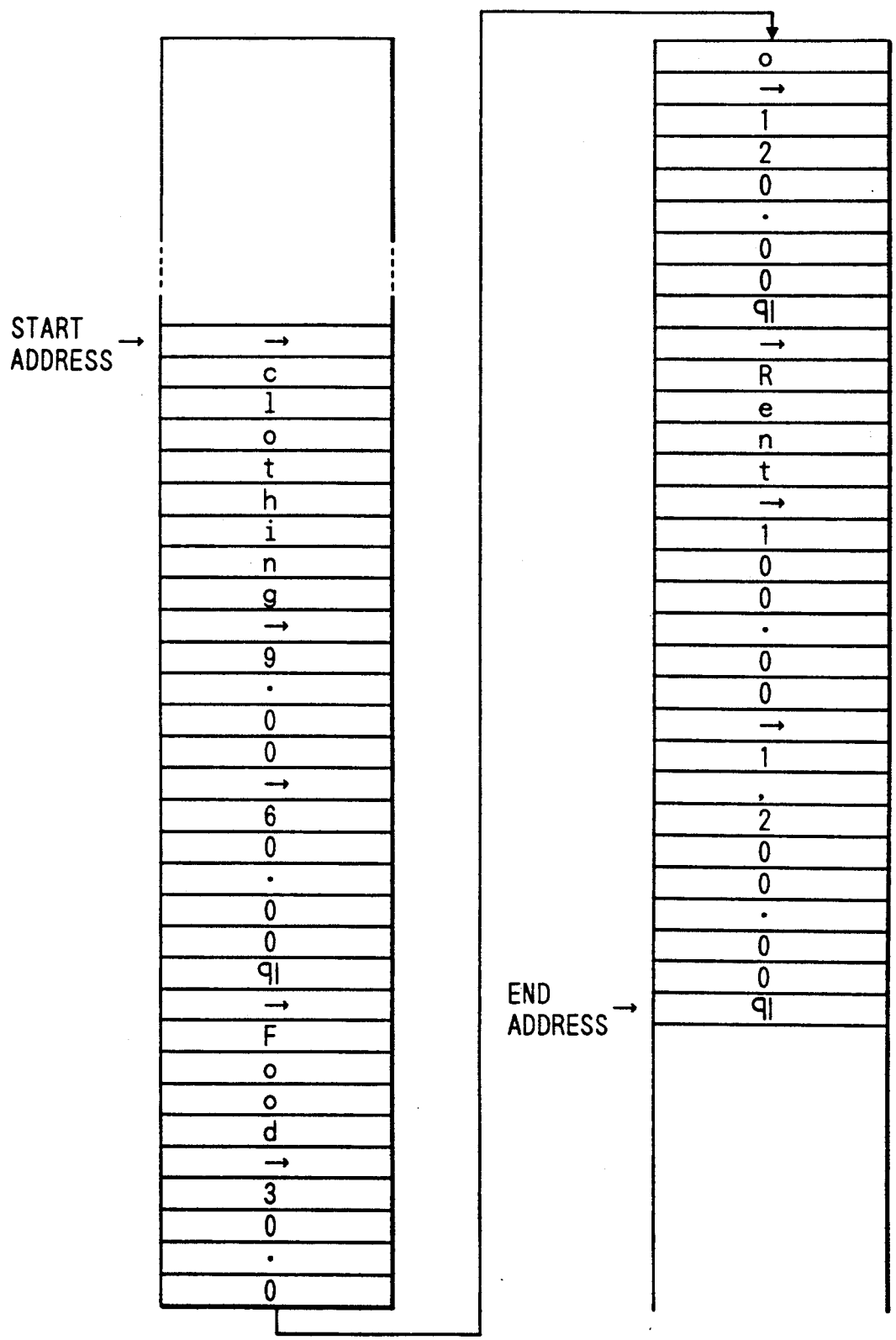
FIG. 13 shows document information stored in the text buffer and corresponding to FIGS. 12A to 12C.

FIG. 13 shows the content of the text data area 41 at that time. The start address area 31 designates the start address of document information, and the end address area 32 designates the end address of the document information. Note that in FIG. 13, "→" indicates a tab code, and "¶" indicates a return code.

Figure 14:
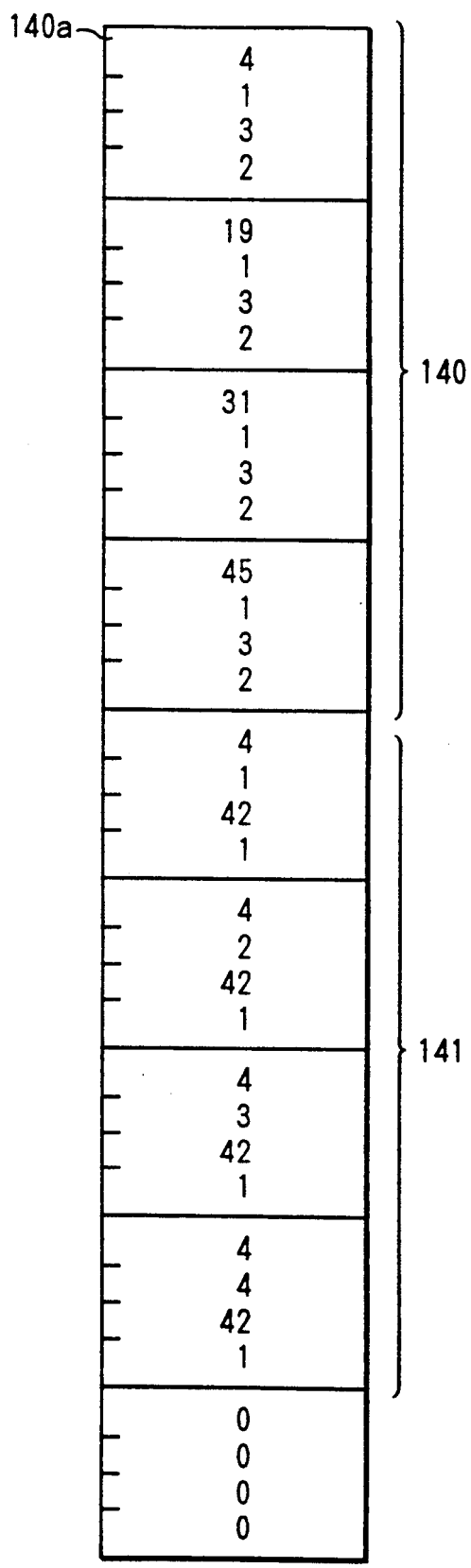
FIG. 14 shows frame information of FIG. 12C.

FIG. 12B shows a display example determined by selecting tab information corresponding to tab codes set on the basis of the document information shown in FIG. 13. In FIG. 12B, "t" indicates a standard tab set position, and "d" indicates a decimal tab set position. FIG. 12C shows a frame at that time. This frame data is automatically generated by a process to be described later. FIG. 14 shows frame data at that time. In FIG. 14, 140 designates four vertical line data in FIG. 12C, and 141 designates four horizontal line data in FIG. 12C.

Change Right Margin Position (FIGS. 15A to 15C)

FIGS. 15A, 15B, and 15C are views for explaining an automatic changing operation of a right margin upon input of table data. In FIG. 15A, a document (numerals) is input up to a right margin position indicated by "R", and an input operation is made to a position indicated by a cursor 151 in FIG. 15A. FIG. 15B shows a case wherein numerals are input in the same line. In this case, the right margin position is moved to the right in correspondence with the input position. FIG. 15C shows a case wherein numerals are kept input in the same line. In this case, the right margin is moved to a maximum allowable range (position of "R") of one line. In this manner, when a document is input while exceeding the right margin position, the right margin position is moved in correspondence with an input of the document information.

FIGS. 16A to 16C show a data format of the work area 33 (FIG. 4) in the work data area 21.

Description of Position Information and Format Information (FIGS. 16A to 18D)

FIG. 16A shows a table for holding position information used for determining a tab position. This table can store (N-1) pieces of item information per line. Of the data of this table, $wP_n$ represents the number of digits of numerals on the left-hand side of a decimal point, and $wS_n$ represents the number of digits (including the decimal point) of numerals on the right-hand side of the decimal point. $wT_n$ is given by $wT_n = wP_n + wS_n$.

Therefore, as shown in FIG. 16B, as for "1234.00", since $wP_n = 4$ and $wS_n = 3$, $wT_n = 7$. The table shown in FIG. 16A is generated when data in table data are checked, and maximum numbers in items are set.

Figure 9C:
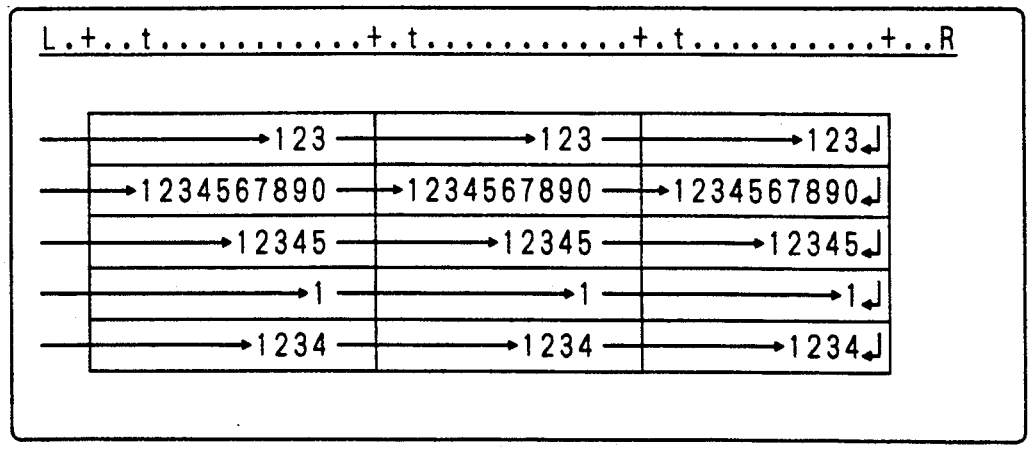

FIG. 16C shows values determined by the second line in FIG. 9C including maximum items. In this case, maximum item lengths $wT_1$, $wT_2$, and $wT_3$ are determined, and the lengths of space portions assigned on both sides of these items are indicated by $w_1$ to $w_3$. Note that $w_n$ in FIG. 16A corresponds to $w_1$ to $w_4$ in FIG. 16C.

FIGS. 17A to 17D show position information of these data. For example, FIG. 17A corresponds to position information of FIG. 8B. This position information is set for a line (second line) in which items have a maximum numbers of digits. More specifically, the number of digits $w_1$ of a left-end space is set to be "5", and the number of characters $wP_1$ of the first item is "10". Since this value does not include digits below the decimal point, $wT_1$ is also set to be "10". Spaces $w_2$ and $w_3$ between the first and second items and between the second and third items are set to be "4". The number of digits $w_4$ of a right-end space is set to be "5".

Similarly, FIG. 17B shows position information of FIG. 9B, FIG. 17C shows position information of FIG. 10B, and FIG. 17D shows position information of FIG. 12B. In FIG. 17D, $w_1 = 7$, $wP_1$ represents 8 digits of "clothing", $wP_2$ is "3" on the basis of the number of digits higher than the decimal point of a number "100.00" of the second item, and $wS_2$ represents 3 digits including the decimal point. As a result, $wT_2$ is "6". Then, $w_2$ is obtained as "6", based on a space between the last character position of characters "clothing" having the maximum number of digits in the first item, and the start position of a the number "100.00" having the maximum number of digits in the second item. Similarly, $wP_3 = 5$, $wS_3 = 3$, and $wT_3 = 6$, based on the number "1,200.00" in the third item.

FIGS. 18A to 18D show an example of format information shown in detail in FIGS. 16A to 16C. FIG. 18A shows format information of FIG. 8B. In this case, the left margin position is set to be "1", and the right margin position is set to be "48". Standard tabs are set at three tab positions (indicated by "t"), i.e., 6th, 20th, and 34th columns.

FIG. 18B shows format information of FIG. 12B. A standard tab is set at an 8th column, and decimal tabs (d) are set at 25th and 40th columns. Similarly, FIG. 18C shows format information of FIG. 10B Centering tabs (c) are set at 10th, 24th, and 38th columns. FIG. 18D shows format information of FIG. 9B. In FIG. 18D, right alignment (justification) tabs are set at 15th, 29th, and 43rd columns.

A method of obtaining a tab position will be explained below based on the above description.

(1) Standard Tab ($T_m$: a tab position for an mth

A standard tab position can be computed by the following equation:

$$T_m = \left\{ \sum_{n=1}^{m} (w_n + wT_{n-1}) \right\} + 1$$

Note that $wT_0 = 0$. When tab positions are computed based on the values in FIG. 17A using this equation, $T_1 = w_1 + 1 = 6$, $T_2 = (5 + 4 + 10) + 1 = 20$, $T_3 = (5 + 4 + 10 + 4 + 10) + 1 = 34$. These values correspond to tab positions shown in FIG. 8B.

(2) Right Alignment Tab ($RT_m$)

A right alignment tab of an mth item can be obtained by the following equation:

$$RT_m = \left\{ \sum_{n=1}^{m} (w_n + wT_n) \right\}$$

When the right alignment tab positions are obtained based on the values in FIG. 17B, $RT_1 = 5 + 10 = 15$, $RT_2 = 5 + 10 + 4 + 10 = 29$, and $RT_3 = 5 + 10 + 4 + 10 + 4 + 10 = 43$. These values correspond to tab positions in FIG. 9B.

(3) Centering Tab ($CT_m$)

$$CT_m = \left\{ \sum_{n=1}^{m} (w_n + wT_{n-1}) \right\} + wT_n/2$$

When the centering tab positions are obtained on the values in FIG. 17C, $CT_1=5+10/2=10$, $CT_2=(5+4+10)+10/2=24$, and $CT_3=(5+4+10+4+10)+10/2=38$. These centering tab positions correspond to positions in FIG. 9B. When $wT_n/2$ does not yield an integer, a value of $(wT_n+1)/2$ is adopted.

(4) Decimal Tab ($DT_m$)

$$DT_m = \left\{ \sum_{n=1}^{m} (w_n + wT_{n-1}) \right\} + wP_n$$

When decimal tab positions are obtained based on the values in FIG. 17D, $DT_2=(7+6+8)+3=24$, and $DT_3=(7+6+8+6+6)+5=38$. These decimal tab positions correspond to those in FIG. 12B.

A method of obtaining position information of a frame based on information of these positions will be described below.

A column position ($F_m$) of each frame is given by:

$$F_m = \sum_{n=1}^{m+1} (w_{n-1} + wT_{n-1}) + w_n/2 + 1$$

When m = the maximum number of digits, we have:

$$F_m = \sum_{n=1}^{m+1} (w_{n-1} + wT_{n-1}) + w_n/2$$

Note that $w_0=wT_0=0$. When $w_n/2$ cannot yield an integer, $[W_n/2]$ ([ ] are Gaussian symbols) is employed. For example, frame information of FIG. 12C is obtained based on the values in FIG. 17D. More specifically, $F_1=7/2+1=4$, $F_2=7+8+6/2+1=19$, $F_3=7+8+6+6+6/2+1=31$, and $F_4=7+8+6+6+6+8+6/2=44$, thus obtaining column position information of the frame information shown in FIG. 12C.

Description of Operation (FIGS. 19 to 26)

FIGS. 19 to 26 are flow charts showing processes in this English word processor. The control programs for executing these control operations are stored in the program ROM 3. The operations of this embodiment will be described below with reference to these flow charts and the drawings mentioned above.

Figure 19:
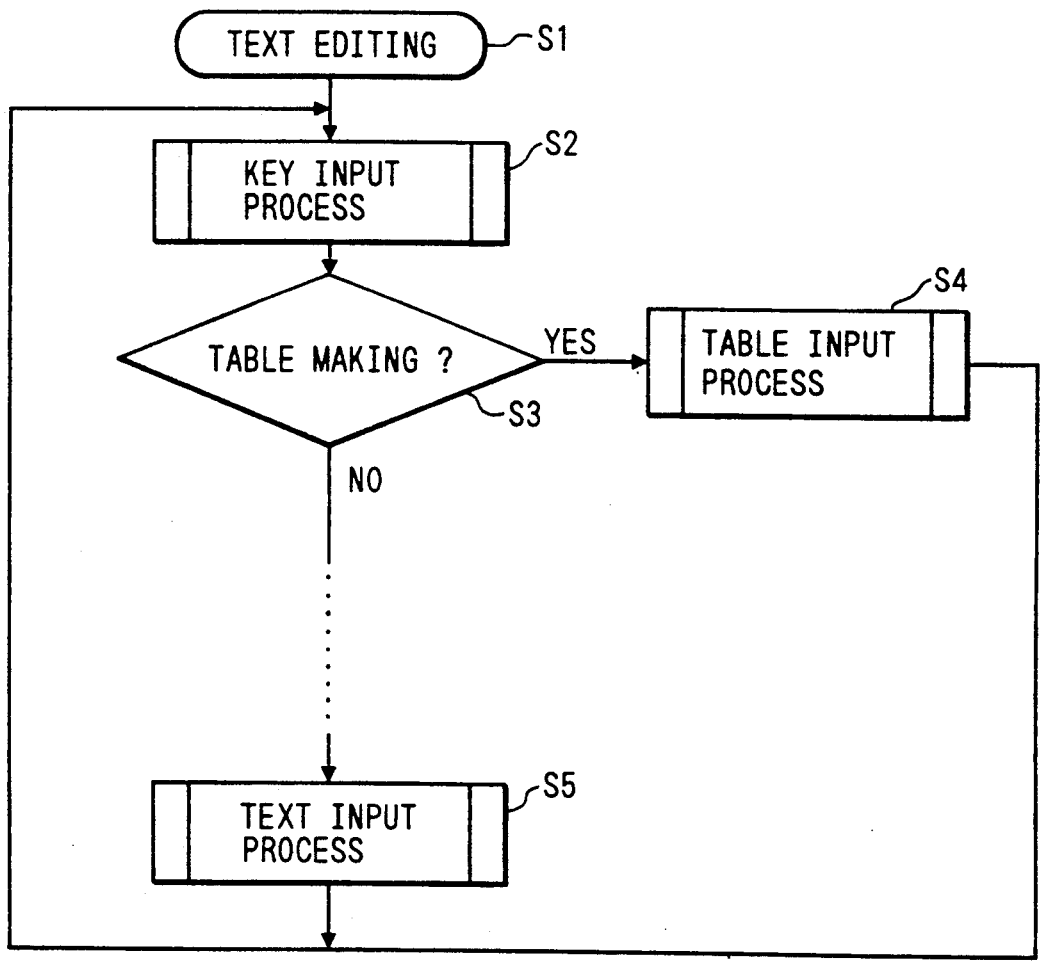
FIG. 19 is a flow chart showing a text editing process in the word processor of the embodiment shown in FIG. 1.

FIG. 19 shows a text editing process of the word processor of this embodiment. This process is started when document information is input from the KB 1.

In step S2, a key input process of a key code input from the KB 1 is executed. In step S3, it is checked if the input key is a table making key for starting a table process. If YES in step S3, the flow advances to step S4, and the table input process is executed. If NO in step S3, the flow advances to a corresponding process routine. For example, in step S5, a text input process by character keys is executed. The table process as the characteristic feature of this embodiment will be described below.

Figure 20:
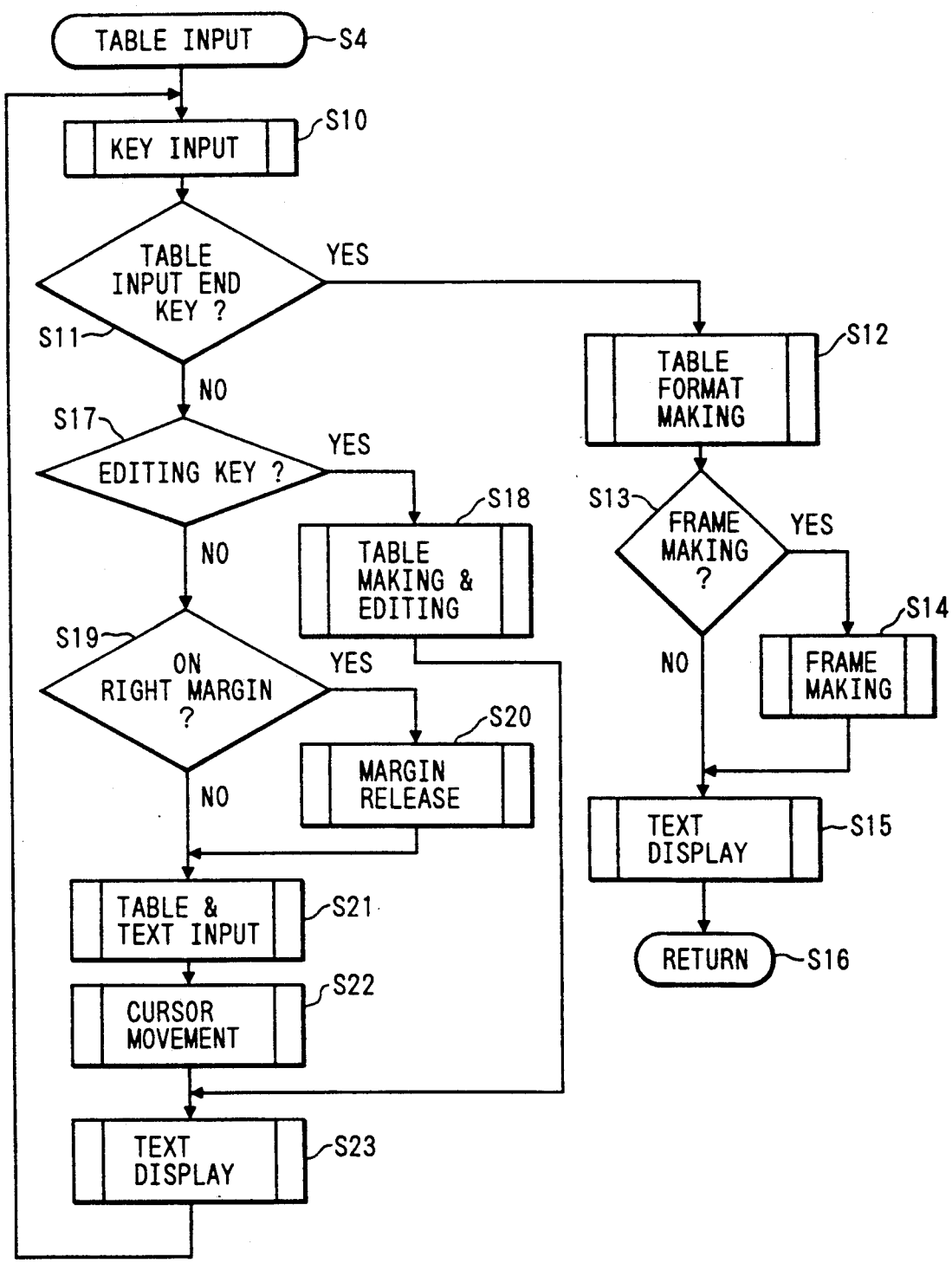

FIG. 20 is a flow chart showing the table input process in step S4 in FIG. 19.

In step S10, an input process of a key code input from the KB 1 is executed, and it is checked in step S11 if a table input end key is depressed. If YES in step S11, the flow advances to step S12, and table format information is formed. This process will be described later with reference to FIG. 22 and subsequent drawings.

The flow then advances to step S13 to check if a frame making process is instructed. If YES in step S13, the flow advances to step S14, and frame information is formed. The frame information making process will be described in detail later with reference to FIG. 26. The flow then advances to step S15, and a text display process of a text including table information is executed.

If it is determined in step S11 that the table input end key is not depressed, the flow advances to step S17 to check if an editing key is depressed. If YES in step S17, the flow advances to step S18, and a table making & editing process is executed. Thereafter, the flow advances to the text display process in step S23. If NO in step S17, however, the flow advances to step S19 to check if an input character code is on the right margin position. If YES in step S19, the flow advances to step S20 to execute a right margin release process. In step S22, a cursor movement process upon input of a function key or a character key is executed. The flow then advances to step S23, and a text display process is executed. Of steps S17 to S23, process routines excluding step S20 are known to those who are skilled in the art, and a description thereof will not be particularly made here.

Figure 21:
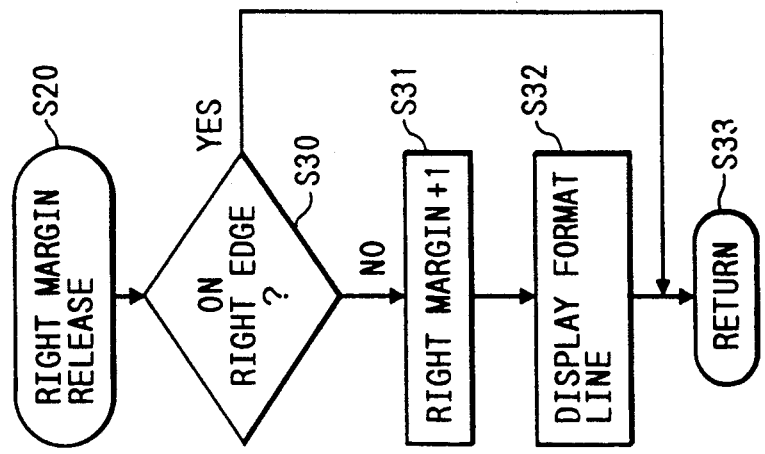

FIG. 21 is a flow chart showing the right margin release process in step S20 in FIG. 20.

It is checked in step S30 if the right margin position is a maximum (right end) position. If YES in step S30, since the right margin position can no longer be moved to the right, the flow returns to the main routine in step S33. If NO in step S30, the flow advances to step S31, and the right margin position is incremented by one in a column direction. In step S32, the mark "R" is displayed at a position, corresponding to the right margin position, on the format line 70, as shown in FIG. 8, and the like.

The right margin release process is executed, as shown in FIGS. 15A to 15C. As described above, the right margin is moved from a state shown in FIG. 15A to a state shown in FIG. 15B upon an input of a character key, and is released up to the right end position, as shown in FIG. 15C.

Figure 22:
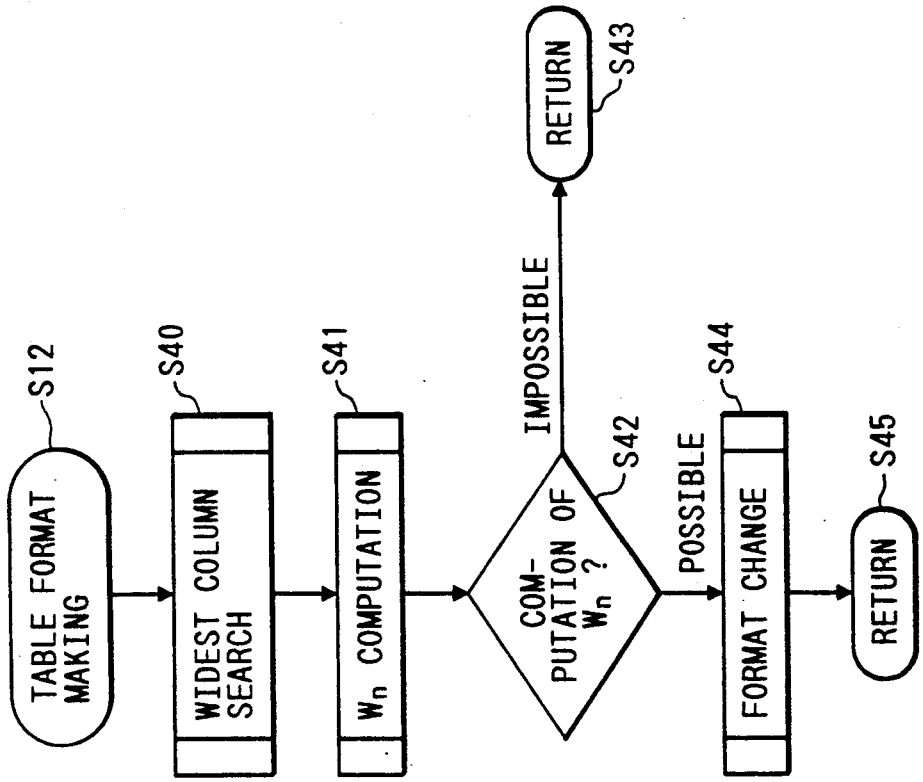

FIG. 22 is a flow chart showing the table format making process in step S12 shown in FIG. 20. When the end of a table making operation is instructed, the flow advances to step S40, and a widest column search process is executed. The flow then advances to step S41, and $w_n$ is computed. In step S42, it is checked if it is impossible to compute $w_n$. If it is determined in step S42 that it is impossible to compute $w_n$, the flow returns to the main routine in step S43; otherwise, the flow advances to step S44 to execute a format change process.

Figures 2, 23A:
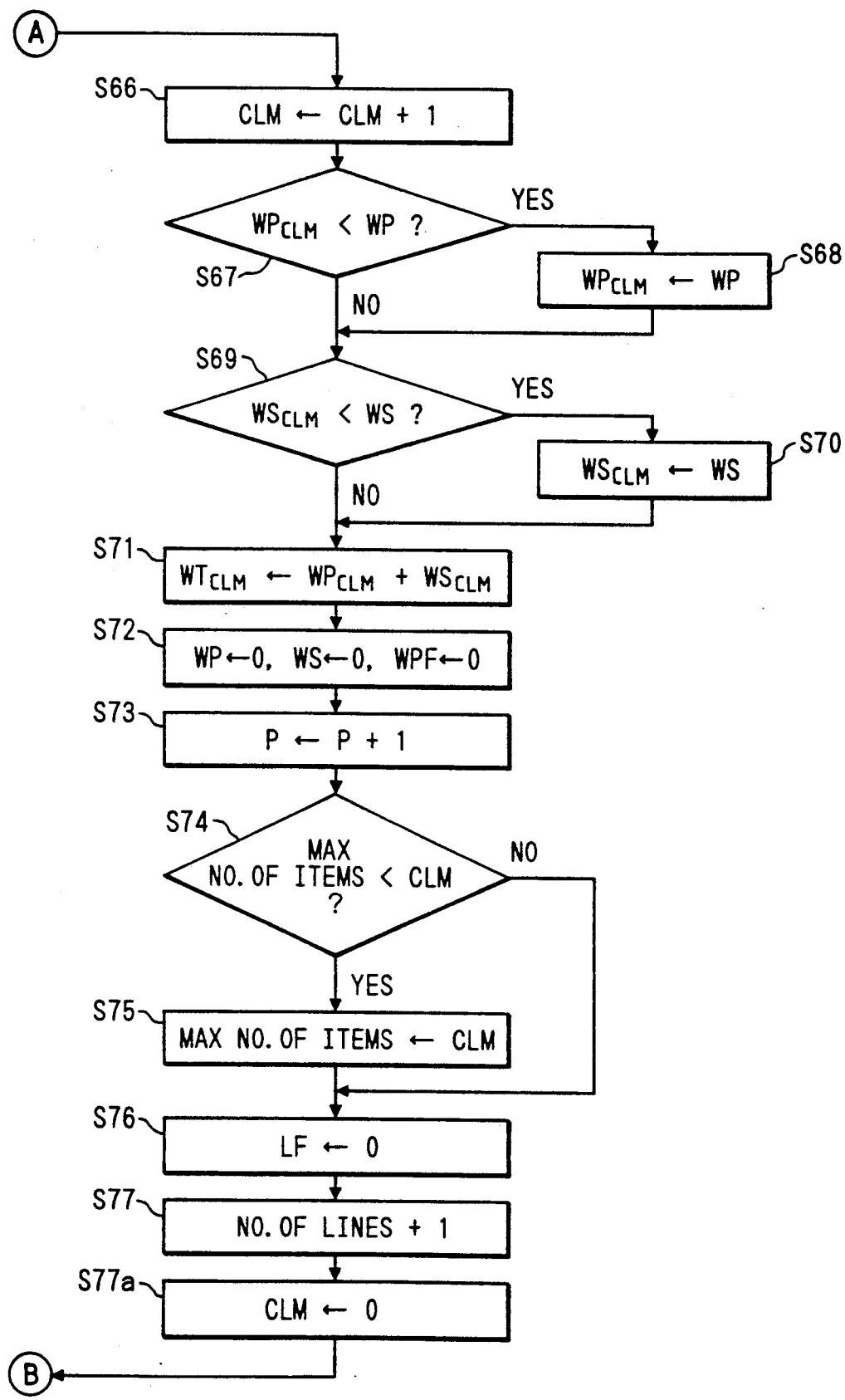
Figure 23B:
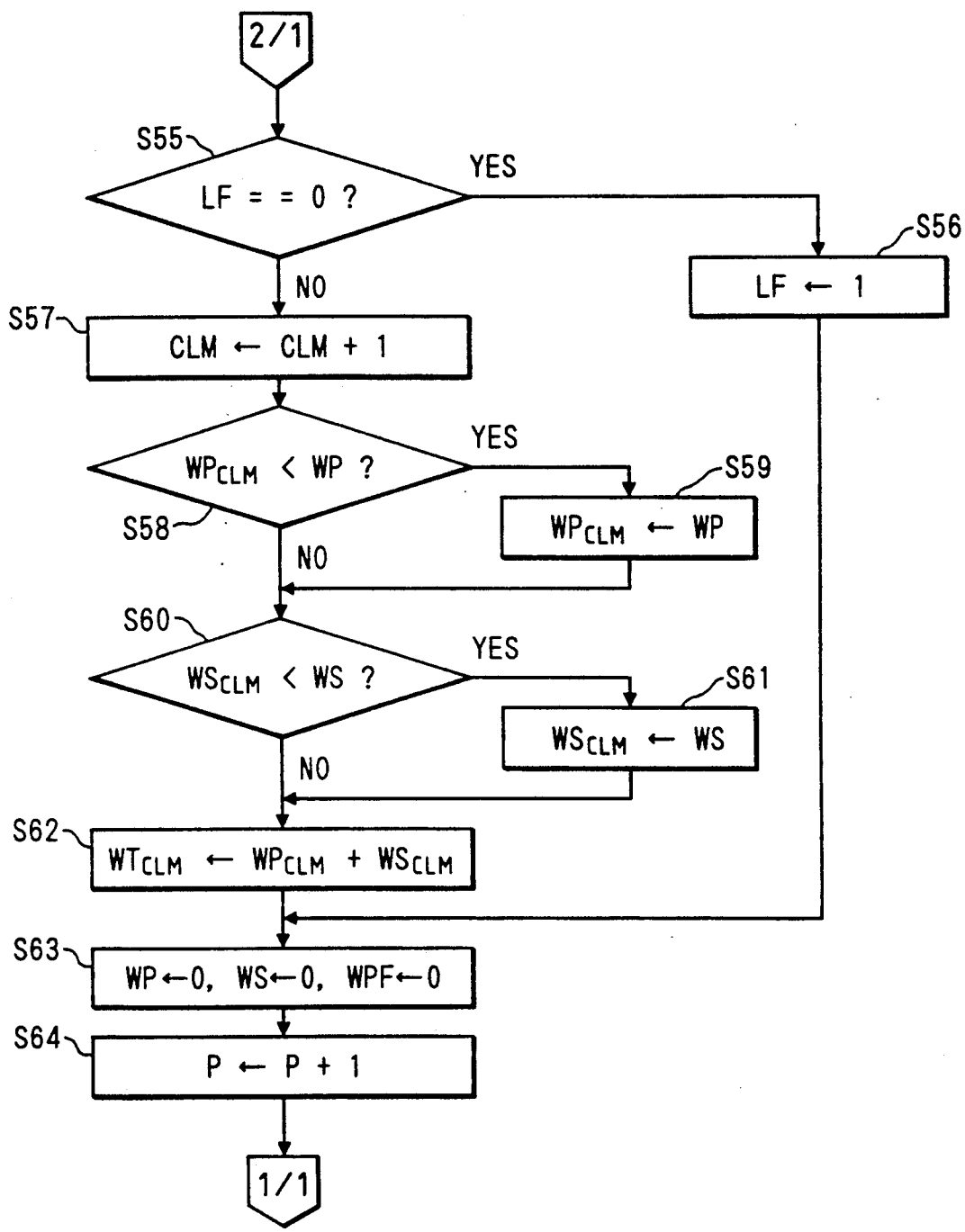
Figure 24:
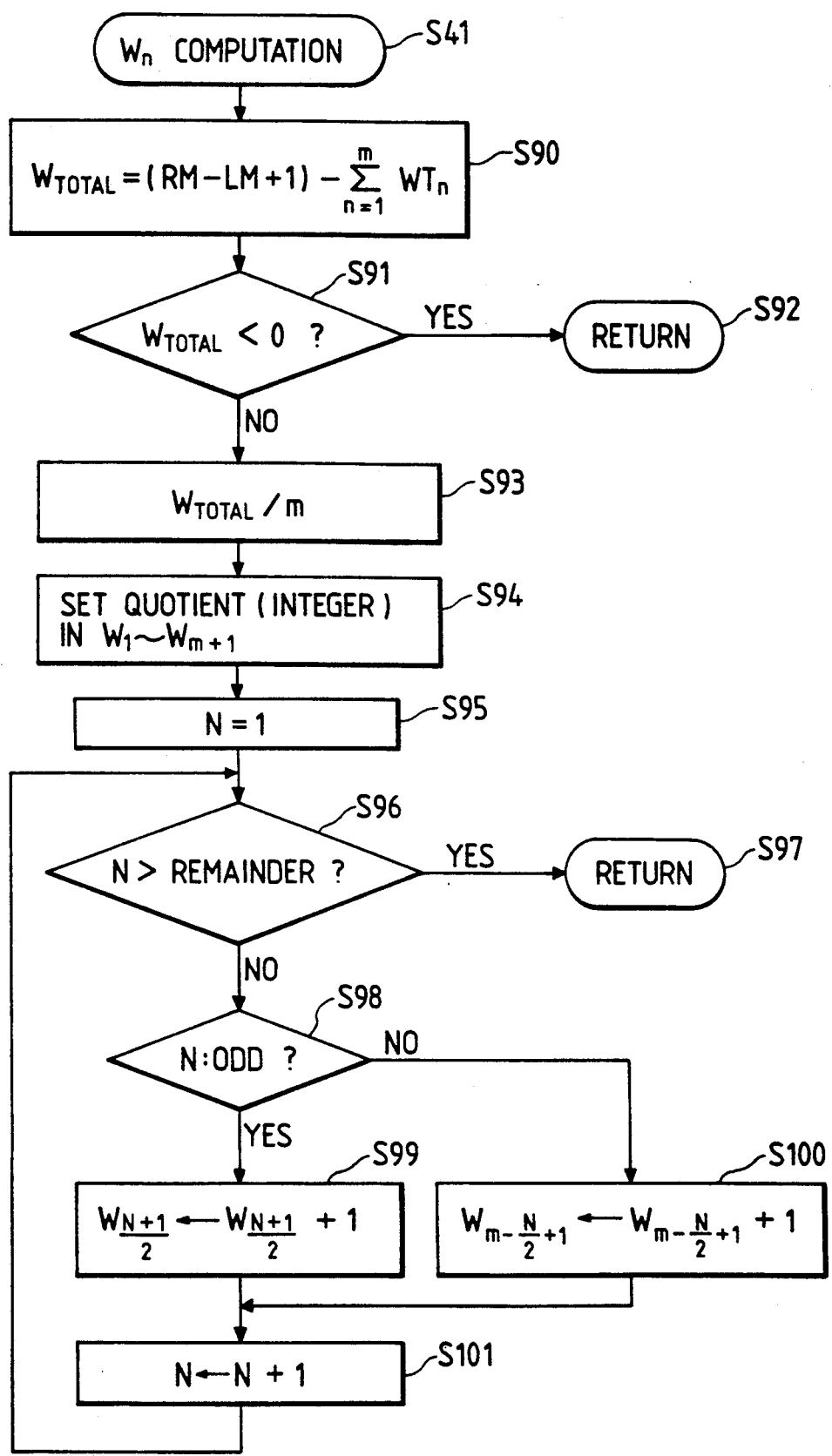

FIGS. 23A and 23B are flow charts showing the widest column search process in step S40 shown in FIG. 22. This process will be explained below. In step S51, the start address 31 of the text information is set in an address pointer P of the work data area 21, and "0" is set in the area 30 for the maximum numbers of digits, CLM, WP, WS, LF, WPF, and the area 34 for the number of lines. The area 30 for the maximum number of digits stores the maximum number of digits of items in one line, the area CLM stores a maximum item count, and the areas WP and WS store the maximum widths in the items, as described above. LF is a flag indicating whether or not a return operation is performed. If the flag LF is "0", it indicates that the pointer P is located at a position immediately after the return operation. WPF is a flag for indicating whether the value of the maximum width is set in WP or WS. If the flag WPF is "0", the value is set in WP; otherwise, the value is set in WS.

It is checked in step S52 if the pointer P coincides with the end address of a text. If YES in step S52, the flow returns to the main routine in step S53. It is checked in step S54 if data (*P) of an address indicated by the pointer P is a tab code. If YES in step S54, the flow advances to step S55. It is checked in step S55 if the flag LF is "0". If YES in step S55, since this means that the line starts from a tab code, and the number of characters need not be checked, the flow advances to step S56, and "1" is set in the flag LF. The flow then advances to step S63.

If NO in step S55, the flow advances to step S57, CLM is incremented by one to increment the item count by one. In step S58, the value of $wP_{CLM}$ in an item indicated by CLM is compared with the value of WP. If it is determined in step S58 that WP is larger than $wP_{CLM}$, the flow advances to step S59, and the value of WP is set in $wP_{CLM}$. Similarly, the value of $wS_{CLM}$ is an item indicated by CLM is compared with the value of WS in step S60. If it is determined in step S60 that WS is larger than $wS_{CLM}$, the flow advances to step S61, and the value of WS is set in $wS_{CLM}$. In step S62, ($wP_{CLM}+wS_{CLM}$) is set in $wT_{CLM}$. Thus, the maximum number of characters of an item is set in $wT_{CLM}$. In step S63, WP, WS, and WPF are all cleared to "0". In step S64, the address pointer P is incremented by one, and the flow advances to step S52. Thus, the maximum $WP_{CLM}$ and $WS_{CLM}$ corresponding to each item are set (CLM=1 to m).

If it is determined in step S54, the data *P is not a tab code (→), the flow advances to step S65 to check if a return code (¶) is set at an address of the text buffer 22 indicated by the pointer P. If YES in step S65, the flow advances to step S66, and the item count CLM is incremented by one. It is checked in step S67 if the number of characters wP is larger than the number of characters $WP_{CLM}$ (or the number of characters above the decimal point) of the item. If YES in step S67, the value of wP is set in $WP_{CLM}$ in step S68. Similarly, if it is determined that wS is larger than $WS_{CLM}$, the flow advances to step S70, and the value of WS is set in $WS_{CLM}$. Thus, the flow advances to step S71, and ($WP_{CLM}+WS_{CLM}$) is set in $WT_{CLM}$. In this manner, the number of columns indicating the maximum width of an item indicated by CLM is set in $WT_{CLM}$.

In step S72, WP, WS, and WPF are cleared to "0", and in step S73, the pointer P is incremented by one. It is checked in step S74 if the number of columns (number of digits) exceeds the maximum number of digits. If YES in step S74, the value of CLM is set as the maximum number of digits in step S75. In step S76, the flag LF is set to be "0", and the line counter 34 is incremented by one in step S77. In step S77a, CLM is cleared to "0", and the flow advances to step S52.

If it is determined in step S65 that no return code is set, the flow advances to step S78 to check if the data *P is a decimal point code. If YES in step S78, the flow advances to steps S79 and S80, and the flag WPF is set to be "1". In steps S81 to S83, WS or WP is incremented by one in correspondence with the value of the flag WPF. This operation is to count a number after it is divided into integer and decimal parts at the decimal point. In this manner, in step S84, the pointer P is incremented by one, and the flow advances to step S52. When the value of the pointer P reaches the end address, the flow advances from step S52 to step S53 to end the process. Thus, the maximum column width $WT_{CLM}$ (CLM: 1 to m, m is the maximum column count) is set in $WT_{CLM}$ in correspondence with each item.

In this manner, the maximum column width for each item of document information is obtained. The flow then advances to step S41 (FIG. 22), and a space amount ($w_n$) corresponding to each item is computed. This process will be described below with reference to the flow chart of FIG. 24.

In step S90, the number of columns between the right and left margin positions is computed, and a character portion is subtracted from the computed value, thus computing a total of space amounts in one line. This equation is given by:

$$W_{TOTAL} = (RM - LM + 1) - \sum_{n=1}^{m} WT_n$$

where m is the maximum item count.

If it is determined in step S91 that $W_{TOTAL}$ is not a negative value, the flow advances to step S93, and an average space interval is computed by $W_{TOTAL}/m$. The computed average space interval is set in each space region. If a remainder is detected in steps S95 to S101, the remainder is sequentially distributed from the first item. It is checked in step S98 if N is an odd number. If YES in step S98, the flow advances to step S99. For example, if N=1, 1 is added to $w_1$ to increase the first space length. N is then incremented by one, and the flow returns to step S96 to check if the remainder is absorbed. If it is determined in step S96 that the remainder is absorbed and N is larger than the remainder, the flow returns to the main routine in step S97. However, if it is determined in step S96 that N (=2) is smaller than the remainder, the flow advances to step S100. In step S100, the rightmost space width ($w_{m-N/2+1}$) is incremented by one, and the flow advances to the next process. In this manner, the loop of steps S96 to S100 is repeated until the remainder of the division computed in step S94 is distributed to the spaces.

Figure 25:
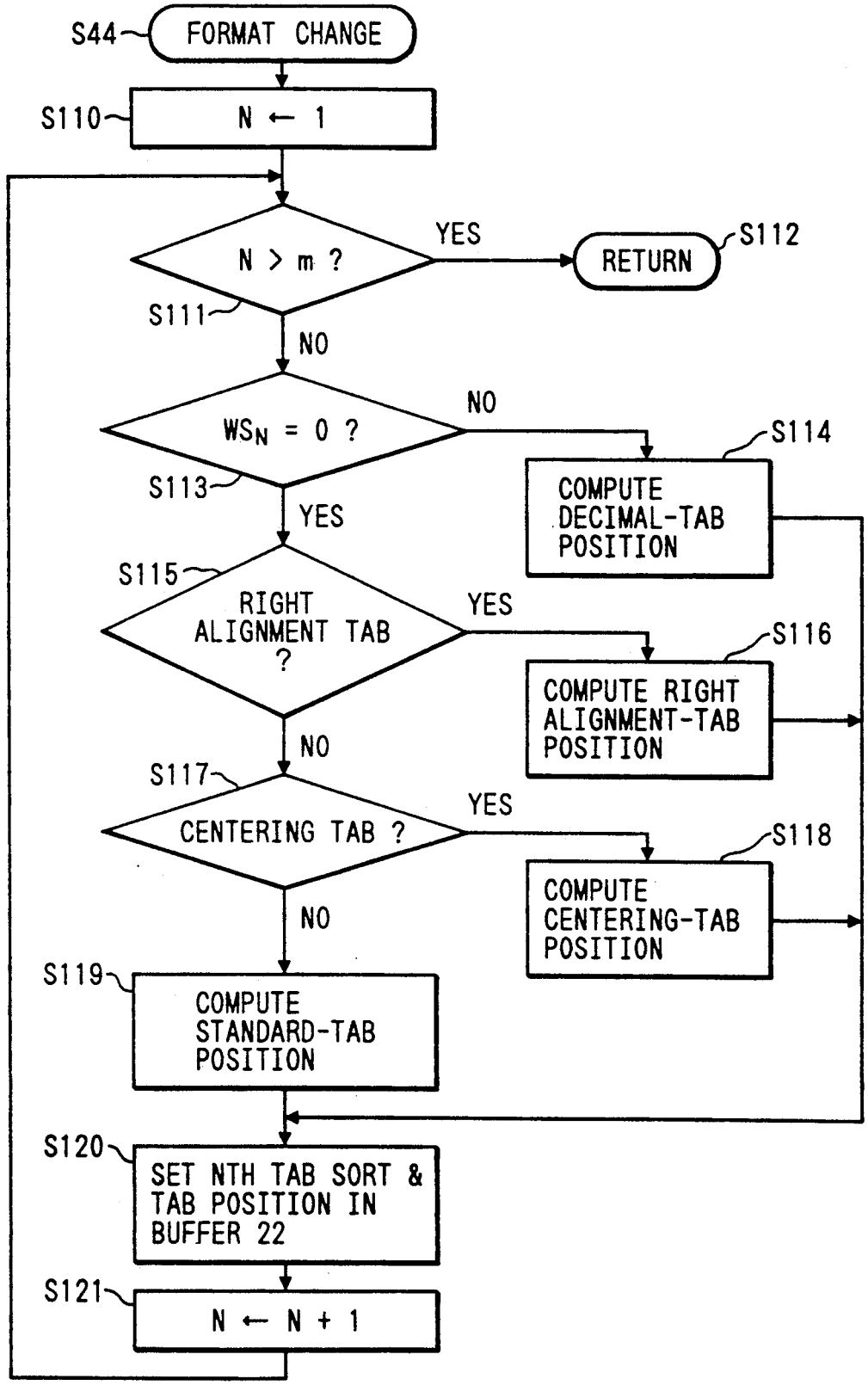

FIG. 25 is a flow chart showing the format change process in step S44 shown in FIG. 22.

In step S110, N=1 is set, and it is checked in step S111 if N is larger than the maximum item count. If YES in step S111, the process is ended. In step S113, $wS_n$ corresponding to a certain item is checked. If $wS_n$="0", the flow advances to step S114, and decimal tabs are computed by the above-mentioned equation. It is checked in step S115 if right alignment tabs are to be set. If YES in step S115, the flow advances to step S116, and tab positions are computed based on the above-mentioned equation. If it is determined in step S117 that centering tabs are to be set, the flow advances to step S118, and centering tab positions are computed on the basis of the above-mentioned equation. However, if NO in step S117, the flow advances to step S119, and standard tab positions are computed on the basis of the above-mentioned equation. Note that as $w_n$, $wT_n$, and $wP_n$ used in these equations, the values computed in step S40 are used.

The flow then advances to step S120, and a sort of tab and a tab position corresponding to an Nth item are set in the format information area 40 (FIG. 6) of the text buffer 22. The flow then advances to step S121 to increment N by one, and the flow then returns to step S111.

FIG. 26 is a flow chart showing the frame information making process in step S14 of FIG. 20.

Figure 8C:
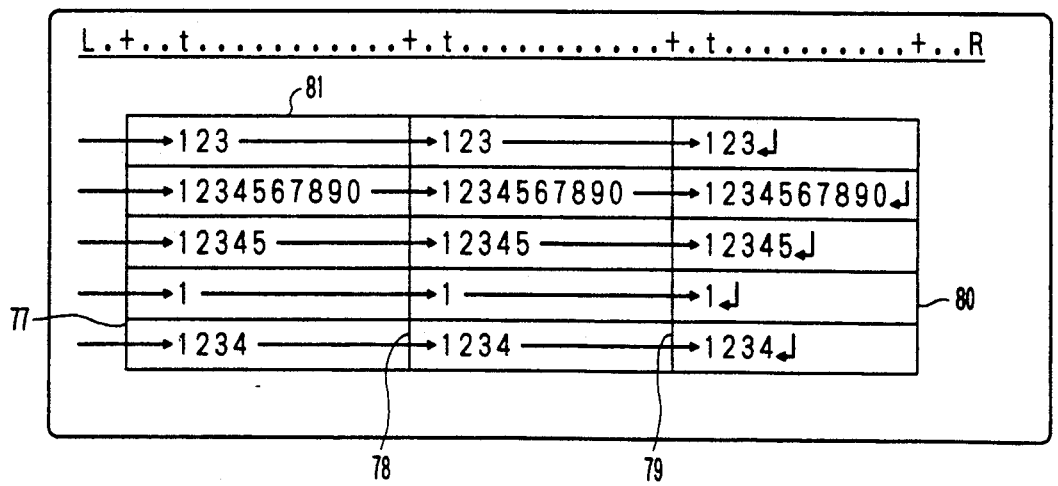

In step S130, the pointer N is set to be "1". If it is determined in step S131 that N is smaller than (m+1: m is the maximum item count), the flow advances to step S139, a y-position is set to be "1" (first line). The flow then advances to step S140, and the horizontal column position is computed by the above-mentioned equation ($\Sigma(w_{n-1}+wT_{n-1})+w_n/2$) for computing a horizontal position of a frame. The flow then advances to step S141, and the number of lines is set in a vertical length. In step S142, vertical line data is set. Thus, for example, data of the vertical line 77 shown in FIG. 8C is obtained, and frame data designated by reference numeral 140a in FIG. 14 is stored. The flow then advances to step S143 to increment N by one, and the flow returns to step S131.

In this manner, after vertical line data are formed in steps S131 to S143, the flow advances to step S132, and the pointer N is set to be "1". In step S132a, the y-position is set to indicate the first line. The flow then advances to step S133, and an x-position is computed by the above-mentioned equation for computing a frame position in correspondence with N=1. If it is determined in step S134 that N is smaller than (the number of lines+1), the flow advances to step S136, and the line position in the y-direction is incremented by one. The flow advances to step S137, and a distance in the x-direction between N=m+1 and N=1 is computed by the above-mentioned equation for computing the frame position. In step S138, horizontal line data is set. The flow then advances to step S138a to increment N by one, and the flow advances to step S134. Thus, horizontal table data is formed, as designated by reference numeral 141 in FIG. 14.

In the above embodiment, position information as a reference for frame or format data is determined on the basis of a character (column) or line position. However, the present invention is not limited to this.

In this embodiment, when table data is input, one sort of tab code is input, and a sort of tab is determined in such a manner that if a decimal point is included, a decimal tab is set upon making of a table format. However, a predetermined sort of tab may be input upon an input of a tab code.

The table data making process in step S12 of FIG. 20 has been described with reference to a case of setting standard tabs. However, the present invention is not limited to this. Alternatively, right alignment tabs (FIG. 9), centering tabs (FIG. 10), or decimal tabs (FIG. 12) may be set, as a matter of course.

In this embodiment, divisions of items are designated by the tab key. However, the present invention is not limited to this. The divisions of items may be designated by another function key.

As described above, according to the present invention, an optimal format can be automatically selected to make table data on the basis of document information input as table data.

According to this embodiment, a sorting of tab codes is automatically determined in accordance with the content of table data, thereby determining a format of table data.

When document information or the like is input to exceed a predetermined margin position, the margin position can be automatically moved in a release direction, thus facilitating an input process.

As described above, according to the present invention, table data corresponding to document information can be automatically formed.

A sort of tab can be automatically determined according to document information of each item.

Furthermore, a margin position can be automatically moved in a release direction in correspondence with an input of table information.

What is claimed is:

1. A document processing apparatus comprising:
   margin setting means for setting a margin position of document information to define the number of characters which can be included in one line; and
   margin changing means for, when document information to form a document is input beyond the margin position, changing the margin position set by said margin setting means to increase the number of characters which can be included in one line so as to store the document information.

2. An apparatus according to claim 1, further comprising means for instructing the arranging of the table document information and means for arranging the table document information in the expanded margin position in response to an instruction by said instruction means.

3. An apparatus according to claim 2, further comprising means for generating a vertical line to partition the arranged table document information.

4. A document processing apparatus comprising:
   input means for inputting partition information and item information;
   memory means for storing data of a plurality of lines each comprising of a plurality of pieces of the item information partitioned by the partition information input by said input means;
   instruction means for instructing the arranging of the information; and
   arrangement means for arranging each one line of the item information in response to an instruction by said instruction means and in response to the length of the input information.

5. An apparatus according to claim 4, wherein said memory means stores groups of item information, wherein said apparatus further comprises means for detecting the longest item information in each group of item information stored in said memory means, wherein said arrangement means arranges each one line of the item information in response to a span of the longest item information in each group detected by said detection means.

6. An apparatus according to claim 5, wherein the item information is designated by a tab code and said arrangement means includes selection means for selecting the kind of tab for each item in response to the kind of each item information.

7. An apparatus according to claim 4, further comprising means for generating a vertical line to partition the arranged item information.

8. An apparatus according to claim 7, further comprising means for generating a horizontal line to partition each line.

9. An apparatus according to claim 4, further comprising means for displaying each line of the arranged item information.

10. An apparatus according to claim 4, wherein said arrangement means arranges the item information using a left alignment procedure.

11. An apparatus according to claim 4, wherein said arrangement means arranges the item information using a right alignment procedure.

12. An apparatus according to claim 4, wherein said arrangement means arranges the item information using a center alignment procedure.

13. An apparatus according to claim 4, wherein said arrangement means arranges the item information in response to a span of the item information in adjacent lines.

14. A document processing method comprising the steps of:
  setting a margin position of document information to define the number of characters which can be included in one line; and
  changing the margin position, when document information to form a document is input beyond the margin position, to change the margin position set in said margin setting step to increase the number of characters which can be included in one line, so as to store the document information.

15. A method according to claim 14, further comprising a step of instructing the arranging of the table document information and a step of arranging the table document information in the expanded margin position in response to an instruction generated in said instruction step.

16. A method according to claim 15, further comprising a step of generating a vertical line to partition the arranged table document information.

17. A document processing method comprising the steps of:
  inputting item information and partition information for partitioning the item information;
  storing data of a plurality of lines each comprising a plurality of pieces of the item information partitioned by the partition information input in said inputting step;
  instructing the arranging of the item information; and
  arranging each item information in each line in response to an instruction generated in said instructing step and in response to the length of the input information.

18. A method according to claim 15, wherein said storing step stores the item information in groups, wherein said method further comprises the step of detecting the longest item information in each group of item information stored in said storing step, wherein said arranging step arranges each item information in response to a span of the longest item information in each group detected in said detecting step.

19. A method according to claim 17, further comprising a step of generating a vertical line to partition the arranged item information.

20. A method according to claim 19, further comprising a step of generating a horizontal line to partition each line.

21. A method according to claim 17, further comprising a step of displaying the arranged item information.

22. A document processing method comprising the steps of:
  setting a margin position of document information stored in a document processing apparatus; and
  adjusting the margin position, when document information to form a document is input into the document processing apparatus, so as to store the document information in accordance with a length of the document information.

23. A method according to claim 22, further comprising a step of instructing the arranging of the table document information and a step of arranging the table document information in the adjusted margin position in response to an instruction generated in said instructing step.

24. A method according to claim 23, further comprising a step of generating a vertical line to partition the arranged table document information.

* * * * *

UNITED STATES PATENT AND TRADEMARK OFFICE
CERTIFICATE OF CORRECTION

PATENT NO. : 5,299,303
DATED : March 29, 1994
INVENTOR(S) : FUKUNAGA

It is certified that error appears in the above-indentified patent and that said Letters Patent is hereby corrected as shown below:

<u>Column 2</u>

Line 56, change "EMBODIMENT" TO --EMBODIMENTS--.

<u>Column 6</u>

Line 40, change "mth" to --mth item)--.

<u>Column 7</u>

Line 6, change "obtained" to --obtained based--.

<u>Column 8</u>

Line 14, change "&" to --and--.

Signed and Sealed this

Thirtieth Day of August, 1994

Attest:

BRUCE LEHMAN

Attesting Officer     Commissioner of Patents and Trademarks